US012683741B2

(12) United States Patent
Jiang et al.

(10) Patent No.: US 12,683,741 B2
(45) Date of Patent: Jul. 14, 2026

(54) METHOD AND UE FOR BEAM-BASED WIRELESS COMMUNICATION

(71) Applicant: Apogee 5G Global, LLC, Plano, TX (US)

(72) Inventors: Qi Jiang, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 390 days.

(21) Appl. No.: 18/132,412

(22) Filed: Apr. 9, 2023

(65) Prior Publication Data

US 2023/0283433 A1 Sep. 7, 2023

Related U.S. Application Data

(63) Continuation of application No. PCT/CN2021/122734, filed on Oct. 9, 2021.

(30) Foreign Application Priority Data

Oct. 10, 2020 (CN) .......................... 202011076544.8
Oct. 23, 2020 (CN) .......................... 202011144604.5

(51) Int. Cl.
*H04L 5/00* (2006.01)

(52) U.S. Cl.
CPC .................................. *H04L 5/0051* (2013.01)

(58) Field of Classification Search
CPC ..... H04L 5/0051; H04L 5/001; H04L 5/0023; H04L 5/0053; H04L 5/0094;
(Continued)

(56) References Cited

U.S. PATENT DOCUMENTS

2015/0180625 A1 6/2015 Park
2018/0287860 A1* 10/2018 Xia ..................... H04W 72/046
(Continued)

FOREIGN PATENT DOCUMENTS

CA 3049490 A1 * 7/2018 ........... H04B 7/0452
CN 110391890 A 10/2019
(Continued)

OTHER PUBLICATIONS

ISR received in application No. PCT/CN2021/122734 dated Dec. 29, 2021.
(Continued)

*Primary Examiner* — Ayaz R Sheikh
*Assistant Examiner* — Louis Samara
(74) *Attorney, Agent, or Firm* — Volpe Koenig

(57) ABSTRACT

A method and device in nodes used for wireless communication. A node first receives a first information block and a second information block, then monitors a first signaling; and receives a first signal; the first information block indicates target reference signal resources; the first signaling and the target reference signal resource are QCL, the first signaling indicates a first reference signal resource from a first reference signal resource set, and the first signal and the first reference signal resource are QCL; the second information block indicates L candidate reference signal resource sets, and the first reference signal resource set is one of the L candidate reference signal resource sets; an identity associated with the target reference signal resource is used to determine the first reference signal resource set. The present application optimizes the design method and device of beam activation to improve mobility performance.

20 Claims, 9 Drawing Sheets

(58) Field of Classification Search

CPC . H04L 5/0048; H04B 7/06968; H04B 17/318; H04B 17/345; H04B 17/24; H04B 7/0619; H04W 72/51

See application file for complete search history.

(56) References Cited

U.S. PATENT DOCUMENTS

| | | | | |
|---|---|---|---|---|
| 2019/0327719 A1* | 10/2019 | Liu | ................... | H04B 7/0619 |
| 2020/0052844 A1* | 2/2020 | Yu | ...................... | H04W 72/23 |
| 2020/0112966 A1* | 4/2020 | Liu | ...................... | H04W 52/241 |
| 2020/0260475 A1 | 8/2020 | Yoshimura et al. | | |
| 2020/0266942 A1 | 8/2020 | Akkarakaran | | |
| 2020/0275389 A1* | 8/2020 | Liu | ................... | H04B 17/318 |
| 2020/0280425 A1* | 9/2020 | Wu | ..................... | H04L 5/005 |
| 2023/0058509 A1* | 2/2023 | Yang | .................. | H04L 5/0053 |

FOREIGN PATENT DOCUMENTS

| | | | | | |
|---|---|---|---|---|---|
| CN | 110603871 A | * | 12/2019 | ........... | H04B 17/345 |
| CN | 110719156 A | | 1/2020 | | |
| CN | 110769470 A | | 2/2020 | | |
| CN | 110832920 A | | 2/2020 | | |
| CN | 111010890 A | | 4/2020 | | |
| CN | 111092640 A | | 5/2020 | | |
| CN | 111147203 A | | 5/2020 | | |
| CN | 111669259 A | | 9/2020 | | |
| CN | 111727583 A | | 9/2020 | | |
| CN | 114257274 A | * | 3/2022 | ........... | H04L 5/0053 |
| WO | 2019097478 A1 | | 5/2019 | | |
| WO | WO-2022197416 A1 | * | 9/2022 | ........... | H04W 72/51 |

OTHER PUBLICATIONS

First Search Report of Chinese patent application No. CN202011076544.8 dated Jul. 22, 2022.

Notification to Grant Patent Right for Invention of Chinese patent application No. CN202011076544.8 dated Aug. 3, 2022.

Intel Corporation Corrections to QCL for NR 3GPP TSG RAN WG1 Meeting AH 1801 R1-1800320 Jan. 13, 2018.

First Search Report of Chinese patent application No. CN202211128560.6 dated Jan. 31, 2024.

Notification to Grant Patent Right for Invention of Chinese patent application No. CN202211128560.6 dated Jan. 17, 2024.

First Office Action of Chinese patent application No. CN202011144604.5 dated Jan. 24, 2024.

First Search Report of Chinese patent application No. CN202011144604.5 dated Jan. 23, 2024.

ZTE, Sanechips "Remaining details on QCL"3GPP TSG RAN WG1 Meeting #92 R1-1801590 Feb. 17, 2018.

Samsung "New MAC CEs for NR MIMO"3GPP TSG-RAN WG2 Meeting #101 R2-1802418 Feb. 14, 2018.

Third Generation Partnership Project, "Technical Specification Group Radio Access Network; NR; Physical channels and modulation (Release 16)," 3GPP TS 38.211 V16.3.0 (Sep. 2020).

Third Generation Partnership Project, "Technical Specification Group Radio Access Network; NR; Multiplexing and channel coding (Release 16)," 3GPP TS 38.212 V16.3.0 (Sep. 2020).

Third Generation Partnership Project, "Technical Specification Group Radio Access Network; NR; Physical layer procedures for control (Release 16)," 3GPP TS 38.213 V16.3.0 (Sep. 2020).

Third Generation Partnership Project, "Technical Specification Group Radio Access Network; NR; Physical layer procedures for data (Release 16)," 3GPP TS 38.214 V16.3.0 (Sep. 2020).

Third Generation Partnership Project, "Technical Specification Group Radio Access Network; NR; Medium Access Control (MAC) protocol specification (Release 16)," 3GPP TS 38.321 V16.2.1 (Sep. 2020).

Third Generation Partnership Project, "Technical Specification Group Radio Access Network; NR; Radio Resource Control (RRC) protocol specification (Release 16)," 3GPP TS 38.331 V16.2.0 (Sep. 2020).

* cited by examiner

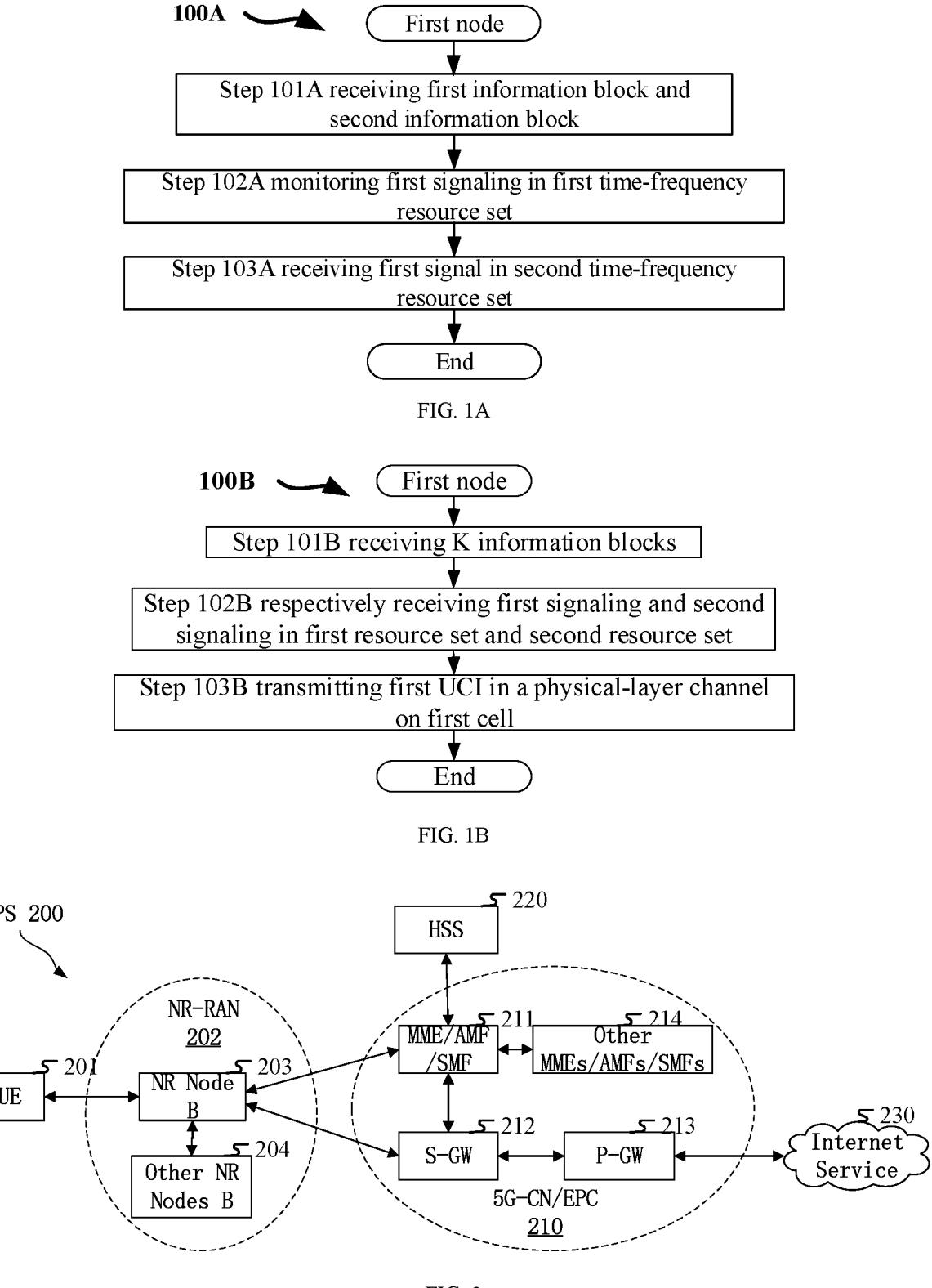

100A

First node

Step 101A receiving first information block and second information block

Step 102A monitoring first signaling in first time-frequency resource set

Step 103A receiving first signal in second time-frequency resource set

End

First node

Step 101B receiving K information blocks

Step 102B respectively receiving first signaling and second signaling in first resource set and second resource set Step 103B transmitting first UCI in a physical-layer channel on first cell End

FIG. 1B

EPS 200

HSS 220

NR-RAN 202

UE 201

NR Node B 203

Other NR Nodes B 204

MME/AMF /SMF 211

Other MMEs/AMFs/SMFs 214

S-GW 212

P-GW 213

Internet Service 230

5G-CN/EPC 210

FIG. 2

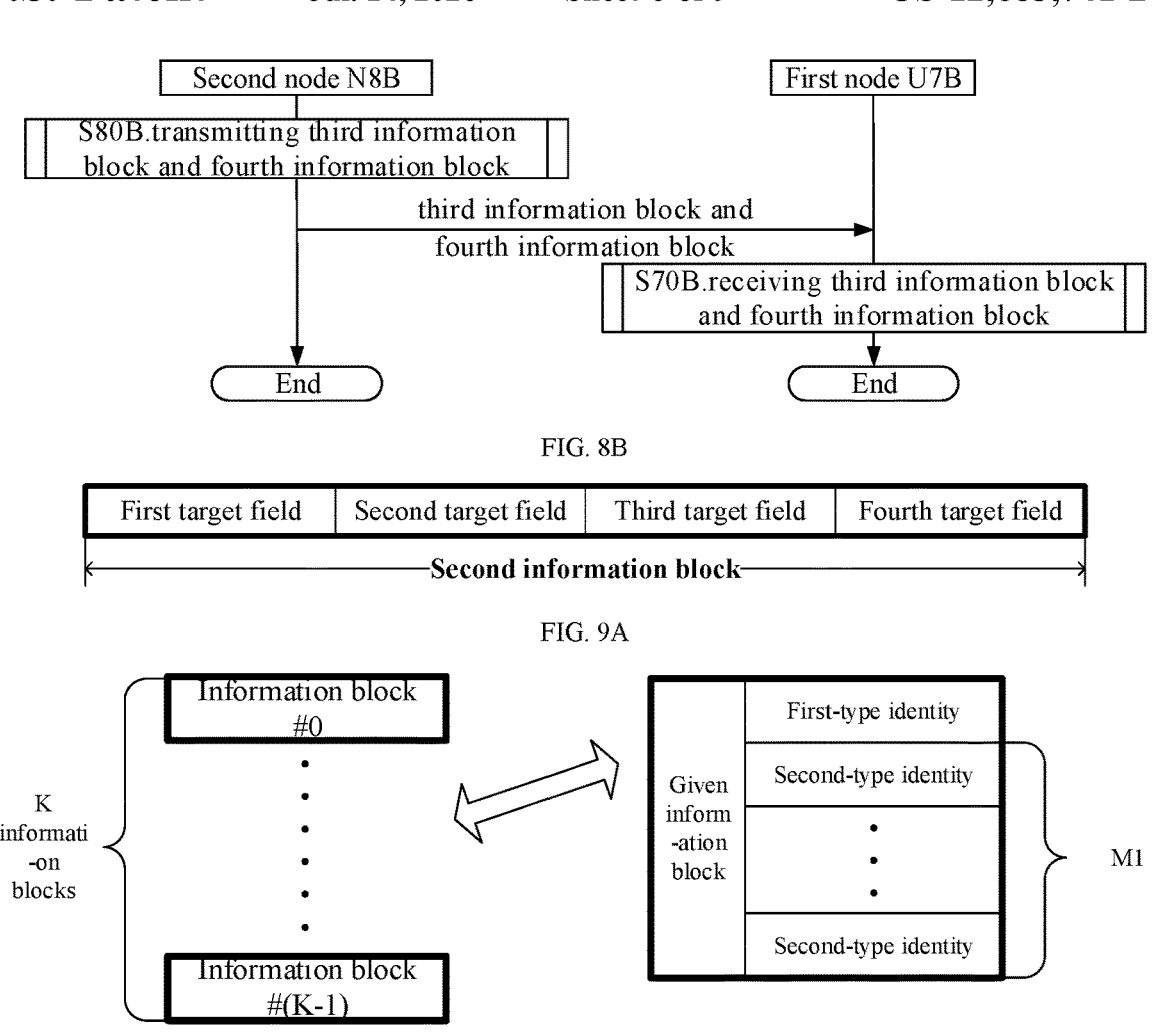
FIG. 8B
FIG. 9A
FIG. 9B
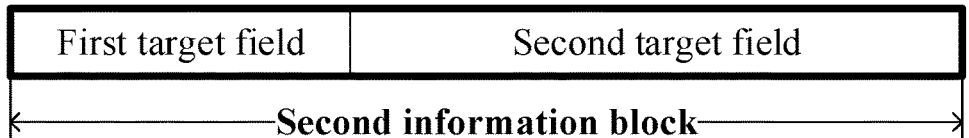
FIG. 10A
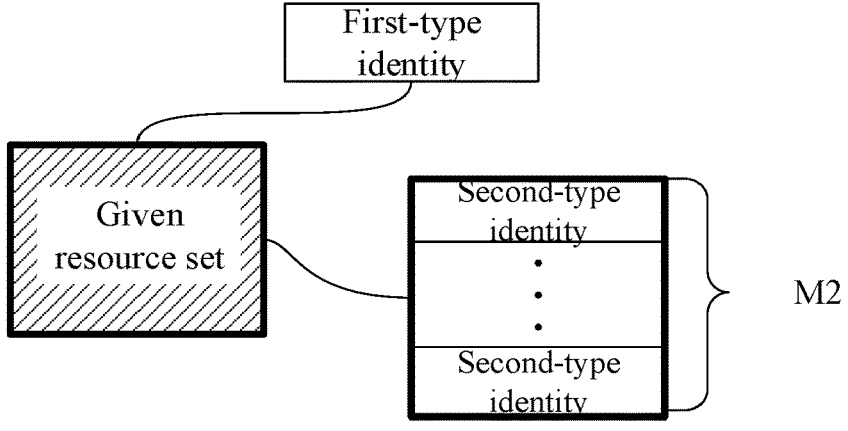
FIG. 10B

METHOD AND UE FOR BEAM-BASED WIRELESS COMMUNICATION

CROSS REFERENCE TO RELATED APPLICATIONS

This application is the continuation of the international patent application No. PCT/CN2021/122734, filed on Oct. 9, 2021, and claims the priority benefit of Chinese Patent Application No. 202011076544.8, filed on Oct. 10, 2020, and claims the priority benefit of Chinese Patent Application No. 202011144604.5, filed on Oct. 23, 2020, the full disclosure of which is incorporated herein by reference.

BACKGROUND

Technical Field

The present application relates to transmission methods and devices in wireless communication systems, and in particular to a design scheme and device of beam triggering in wireless communications.

Related Art

In 5G New Radio (NR), Massive Multi-Input Multi-Output (MIMO) is a key technology. In the massive MIMO, multiple antennas based on beamforming to form a relatively narrow beam which points to a particular direction to improve the quality of communication. In 5G NR, a base station configures the beam transmission characteristics of a control signaling and a data channel through a Transmission Configuration Indication (TCI). For the control signaling, the base station can indicate a TCI state used when blindly detecting a corresponding Control Resource Set (CORE-SET) through Medium Access Control (MAC) Control Elements (CEs); for the data channel, the base station can activate multiple TCI-States through MAC CEs, and dynamically indicate one of them for a Physical Downlink Shared Channel (PDSCH) transmission through Downlink Control Information (DCI), thereby dynamically adjusting a receiving beam.

In NR system, Massive MIMO is an important technical feature. In the massive MIMO, multiple antennas based on beamforming form a narrow beam which points to a particular direction to improve the quality of communication. Since the beam formed through beamforming of multiple antennas is usually narrow, beams from both sides of communication shall be aligned to enable effective communication.

SUMMARY

Inventors find through researches that beam-based communications will bring negative impacts on inter-cell handover, such as extra time delay and ping-pong effect. How to reduce these negative impacts, improve the speed of terminal handover, and further improve the performance of cell-boundary users to meet the needs of various application scenarios is a problem to be solved.

To address the above problem, the present application provides a solution. It should be noted that although the above description uses Massive MIMO and beam-based communication scenarios as examples, the application is also applicable to other scenarios, such as LTE multi antenna systems, where similar technical effects can be achieved. Additionally, the adoption of a unified solution for various scenarios (including but not limited to Massive MIMO, beam-based communications and LTE multi-antenna systems) contributes to the reduction of hardware complexity and costs. If no conflict is incurred, embodiments in any node in the present application and the characteristics of the embodiments are also applicable to any other node, and vice versa. And the embodiments in the present application and the characteristics in the embodiments can be arbitrarily combined if there is no conflict.

In response to the above issues, the present application discloses a method and device for layer 1/2 inter-cell handover and mobility management. It should be noted that the embodiments in a User Equipment (UE) in the present application and characteristics of the embodiments may be applied to a base station if no conflict is incurred, and vice versa. And the embodiments in the present application and the characteristics in the embodiments can be arbitrarily combined if there is no conflict. Though originally targeted at cellular network, the present application is also applicable to Internet of Things (IoT) and Internet of Vehicles (IoV). Though originally targeted at multicarrier communications, the present application is also applicable to single-carrier communications. Though originally targeted at multi-antenna communications, the present application is also applicable to single-antenna communications. Besides, the present application is not only targeted at scenarios of terminals and base stations, but also at communication scenarios between terminals and terminals, terminals and relays, Non-Terrestrial Networks as well as relays and base stations, where similar technical effects can be achieved. Additionally, the adoption of a unified solution for various scenarios, including but not limited to communication scenarios between terminals and base stations, contributes to the reduction of hardware complexity and costs.

Further, the embodiments of a first node in the present application and the characteristics of the embodiments may be applied to a second node if no conflict is incurred, and vice versa. Particularly, for interpretations of the terminology, nouns, functions and variants (if not specified) in the present application, refer to definitions given in Technical Specification (TS) 36 series, TS38 series and TS37 series of 3GPP specifications.

The present application provides a method in a first node for wireless communications, comprising:

receives a first information block and a second information block;

monitoring a first signaling in a first time-frequency resource set; and receiving a first signal in a second time-frequency resource set;

herein, the first information block indicates target reference signal resources; a demodulation reference signal of a channel occupied by the first signaling and the target reference signal resources are Quasi-Co-Located (QCL), the first signaling comprises a first field, the first field in the first signaling indicates a first reference signal resource from a first reference signal resource set, and a demodulation reference signal of a channel occupied by the first signal and the first reference signal resource are QCL; the second information block indicates L candidate reference signal resource sets, L being a positive integer greater than 1, and the first reference signal resource set is one of the L candidate reference signal resource sets; the target reference signal resource is associated with one of L identities, the L identities are respectively associated with the L candidate reference signal resource sets, the first reference signal resource set is a candidate reference signal resource set associated with a first identity among the L candidate reference signal resource sets, and the first identity is an identity associated with the target reference signal resource among the L identities.

In one embodiment, one technical feature of the above method is in: expanding a TCI-State that can be used for a PDSCH transmission from an existing TCI-State set (8 TCI-States in the existing system) to L TCI-States, that is, L candidate reference signal resource sets, and establish a connection between a TCI-State of an indicated Physical Downlink Control Channel (PDCCH) and the above L candidate reference signal resource sets, which TCI-State is adopted by the PDCCH for a reception, a TCI-State used by a PDSCH scheduled by the PDCCH is indicated from a candidate reference signal resource set associated with the TCI-State of the PDCCH among the L candidate reference signal resource sets.

In one embodiment, another technical feature of the above method is in: the L candidate reference signal resource sets are respectively associated with L cells, when the first node moves between multiple cells; the network side can determine a corresponding candidate reference signal resource set from the L candidate reference signal resource sets based on a TCI-State used by the first node for PDCCH blind detecting, and indicate a TCI-State for scheduling; the above method avoids reconfiguring a Radio Resource Control (RRC) signaling used by the first node for beam transmission, and improves scheduling efficiency in mobility management.

In one embodiment, another technical feature of the above method is in: establishing a connection between a beam used to receive a PDCCH and a beam used to receive a PDSCH, when switching between multiple cells, multiple reconfigurations of RRC signalings are avoided, thus improving transmission efficiency and reducing signaling load.

According to one aspect of the present application, a demodulation reference signal of a channel occupied by the first signaling and the target reference signal resource have a first QCL relation, and a Demodulation Reference Signal (DMRS) of a channel occupied by the first signal and the first reference signal resource have a second QCL relation; the first information block comprises a first TCI state, and the first TCI state indicates the target reference signal resource and the first QCL relation; the second information block comprises L TCI state sets, the L TCI state sets respectively correspond to the L candidate reference signal resource sets, any of the L TCI state sets comprises at least one TCI state, and a TCI state in any of the L TCI state sets indicates a candidate reference signal in a corresponding candidate reference signal resource set and a QCL relation; the second QCL relation and the first reference signal resource are indicated by a same TCI state.

According to one aspect of the present application, the L identities respectively indicate L cells; when an identity is used to generate a signal in a reference signal resource, the reference signal resource is associated with the identity; or, when a reference signal resource and a Synchronization Signal/physical broadcast channel Block (SSB) of a cell are QCL, the reference signal resource is associated with an identity indicating the cell.

According to one aspect of the present application, the L identities respectively indicate L cells, radio resources occupied by a reference signal resource are indicated by a configuration signaling, a Radio Link Control (RLC) bearer went through by the configuration signaling is configured through a CellGroupConfig Information Element (IE), and when a Special cell (Spcell) configured by the CellGroupConfig IE comprises a cell, the reference signal is associated with an identity indicating the cell.

According to one aspect of the present application, the first information block comprises a second field, the second field is used to indicate an identity associated with the target reference signal resource among the L identities, and a number of bit(s) occupied by the second field is greater than 5.

In one embodiment, one technical feature of the above method is in: expanding an identity used to indicate a cell associated with a CORESET in a MAC CE, the existing system uses 5 bits to indicate one of 32 serving cells, and the second field in the scheme occupies more than 5 bits to apply to more cells, which further supports mobility management in multiple cells to avoid RRC re-configuration.

According to one aspect of the present application, comprising:

receiving a third information block;

herein, the third information block is used to indicate M1 first-type reference signal resources, M1 being a positive integer greater than 1, the target reference signal resource is one of the M1 first-type reference signal resources, and the first information block is used to indicate the target reference signal resource from the M1 first-type reference signal resources.

According to one aspect of the present application, the second information block comprises L target fields; the L target fields are respectively used to indicate the L candidate reference signal resource sets, and the L identities associated with the L candidate reference signal resource sets.

In one embodiment, one technical feature of the above method is in: by simultaneously triggering the L candidate reference signal resource sets through a MAC signaling, that is, the second information block, using multiple MAC signalings to perform the above operations is avoided, thereby reducing signaling overhead and improving transmission efficiency.

According to one aspect of the present application, comprising:

receiving a fourth information block;

herein, the fourth information block is used to indicate L second-type reference signal resource pools, the L candidate reference signal resource sets respectively correspond to the L second-type reference signal resource pools, and the second information block is used to indicate the L candidate reference signal resource sets from the L second-type reference signal resource pools.

The present application provides a method in a second node for wireless communications, comprising:

transmitting a first information block and a second information block;

transmitting a first signaling in a first time-frequency resource set; and transmitting a first signal in a second time-frequency resource set;

herein, the first information block indicates target reference signal resources; a demodulation reference signal of a channel occupied by the first signaling and the target reference signal resources are QCL, the first signaling comprises a first field, the first field in the first signaling indicates a first reference signal resource from a first reference signal resource set, and a demodulation reference signal of a channel occupied by the first signal and the first reference signal resource are QCL; the second information block indicates L candidate reference signal resource sets, L being a positive integer greater than 1, and the first reference signal resource set is one of the L candidate reference signal resource sets; the target reference signal resource is associated with one of L identities, the L identities are respectively associated with the L candidate reference signal resource sets, the first reference signal resource set is a candidate reference signal resource set associated with a first identity among the L candidate reference signal resource sets, and the first identity is an identity associated with the target reference signal resource among the L identities.

According to one aspect of the present application, a demodulation reference signal of a channel occupied by the first signaling and the target reference signal resource have a first QCL relation, and a DMRS of a channel occupied by the first signal and the first reference signal resource have a second QCL relation; the first information block comprises a first TCI state, and the first TCI state indicates the target reference signal resource and the first QCL relation; the second information block comprises L TCI state sets, the L TCI state sets respectively correspond to the L candidate reference signal resource sets, any of the L TCI state sets comprises at least one TCI state, and a TCI state in any of the L TCI state sets indicates a candidate reference signal in a corresponding candidate reference signal resource set and a QCL relation; the second QCL relation and the first reference signal resource are indicated by a same TCI state.

According to one aspect of the present application, the L identities respectively indicate L cells; when an identity is used to generate a signal in a reference signal resource, the reference signal resource is associated with the identity; or, when a reference signal resource and an SSB of a cell are QCL, the reference signal resource is associated with an identity indicating the cell.

According to one aspect of the present application, the L identities respectively indicate L cells, radio resources occupied by a reference signal resource are indicated by a configuration signaling, an RLC bearer associated with the configuration signaling is configured through a CellGroup-Config IE, and when an Spcell configured by the CellGroup-Config IE comprises a cell, the reference signal is associated with an identity indicating the cell.

According to one aspect of the present application, the first information block comprises a second field, the second field is used to indicate an identity associated with the target reference signal resource among the L identities, and a number of bit(s) occupied by the second field is greater than 5.

According to one aspect of the present application, comprising:

transmitting a third information block;
herein, the third information block is used to indicate M1 first-type reference signal resources, M1 being a positive integer greater than 1, the target reference signal resource is one of the M1 first-type reference signal resources, and the first information block is used to indicate the target reference signal resource from the M1 first-type reference signal resources.

According to one aspect of the present application, the second information block comprises L target fields; the L target fields are respectively used to indicate the L candidate reference signal resource sets, and the L identities associated with the L candidate reference signal resource sets.

According to one aspect of the present application, comprising:

transmitting a fourth information block;

herein, the fourth information block is used to indicate L second-type reference signal resource pools, the L candidate reference signal resource sets respectively correspond to the L second-type reference signal resource pools, and the second information block is used to indicate the L candidate reference signal resource sets from the L second-type reference signal resource pools.

The present application provides a first node for wireless communications, comprising:

a first receiver, receiving a first information block and a second information block;
a second receiver, monitoring a first signaling in a first time-frequency resource set; and
a third receiver, receiving a first signal in a second time-frequency resource set;
herein, the first information block indicates target reference signal resources; a demodulation reference signal of a channel occupied by the first signaling and the target reference signal resources are QCL, the first signaling comprises a first field, the first field in the first signaling indicates a first reference signal resource from a first reference signal resource set, and a demodulation reference signal of a channel occupied by the first signal and the first reference signal resource are QCL; the second information block indicates L candidate reference signal resource sets, L being a positive integer greater than 1, and the first reference signal resource set is one of the L candidate reference signal resource sets; the target reference signal resource is associated with one of L identities, the L identities are respectively associated with the L candidate reference signal resource sets, the first reference signal resource set is a candidate reference signal resource set associated with a first identity among the L candidate reference signal resource sets, and the first identity is an identity associated with the target reference signal resource among the L identities.

The present application provides a second node for wireless communications, comprising:

a first transmitter, transmitting a first information block and a second information block;
a second transmitter, transmitting a first signaling in a first time-frequency resource set; and
a third transmitter, transmitting a first signal in a second time-frequency resource set;
herein, the first information block indicates target reference signal resources; a demodulation reference signal of a channel occupied by the first signaling and the target reference signal resources are QCL, the first signaling comprises a first field, the first field in the first signaling indicates a first reference signal resource from a first reference signal resource set, and a demodulation reference signal of a channel occupied by the first signal and the first reference signal resource are QCL; the second information block indicates L candidate reference signal resource sets, L being a positive integer greater than 1, and the first reference signal resource set is one of the L candidate reference signal resource sets; the target reference signal resource is associated with one of L identities, the L identities are respectively associated with the L candidate reference signal resource sets, the first reference signal resource set is a candidate reference signal resource set associated with a first identity among the L candidate reference signal resource sets, and the first identity is an identity associated with the target reference signal resource among the L identities.

In one embodiment, the present application has the following advantages over conventional schemes:

expanding a TCI-State that can be used for a PDSCH transmission from an existing TCI-State set to L TCI-States, that is, L candidate reference signal resource sets, and establish a connection between a TCI-State of an indicated PDCCH and the above L candidate reference signal resource sets, which TCI-State is adopted by the PDCCH for a reception, a TCI-State used by a PDSCH scheduled by the PDCCH is indicated from a candidate reference signal resource set associated with the TCI-State of the PDCCH among the L candidate reference signal resource sets;

the L candidate reference signal resource sets are respectively associated with L cells, when the first node moves between multiple cells; the network side can determine a corresponding candidate reference signal resource set from the L candidate reference signal resource sets based on a TCI-State used by the first node for PDCCH blind detecting, and indicate a TCI-State for scheduling; the above method avoids reconfiguring a Radio Resource Control (RRC) signaling used by the first node for beam transmission, and improves scheduling efficiency in mobility management;

establishing a connection between a beam used to receive a PDCCH and a beam used to receive a PDSCH, when switching between multiple cells, multiple reconfigurations of RRC signalings are avoided, thus improving transmission efficiency and reducing signaling load.

The present application provides a method in a first node for wireless communications, comprising:

receiving K information blocks, K being a positive integer greater than 1, each of the K information blocks comprising a first-type identity and at least one second-type identity, each of the K information blocks being used to indicate a resource set;

respectively receiving a first signaling and a second signaling in a first resource set and a second resource set; the first resource set being the resource set indicated by a first information block, the first information block being one of the K information blocks, the second resource set being the resource set indicated by a second information block, and the second information block being an information block other than the first information block among the K information blocks;

transmitting first Uplink Control Information (UCI) in a physical-layer channel on a first cell, the first cell being capable of bearing a Hybrid Automatic Repeat request-ACKnowledgement (HARQ-ACK) associated with the first signaling;

herein, name of the first-type identity comprises CORESETPoolIndex; any second-type identity comprised in the K information blocks indicates a reference signal resource; a demodulation reference signal of a channel occupied by the first signaling and a first reference signal resource are QCL, and the second-type identity comprised in the first information block indicates the reference signal resource; a demodulation reference signal of a channel occupied by the second signaling and a second reference signal resource are QCL, and the second-type identity comprised in the second information block indicates the second reference signal resource; the first reference signal resource is associated with a target cell, and the second reference signal resource is associated with a first candidate cell; the first UCI comprises a HARQ-ACK associated with a second signaling, and the first-type identity indicated by the first information block and the target cell are used together to determine whether the first UCI comprises a HARQ-ACK associated with the first signaling.

In one embodiment, one technical feature of the above method is in: according to the existing system, when a first-type identity used by the first resource set and a first-type identity used by the second resource set are the same, that is, the first resource set and the second resource set use a same CORESETPoolIndex, then a HARQ-ACK associated with a first signaling and a HARQ-ACK associated with a second signaling can use a same HARQ-ACK codebook; then in layer 1/2 mobility, the first resource set and the second resource set may belong to different cells or reference signal resources associated with different cells are QCL, therefore, it is not enough to judge the division of HARQ-ACK codebooks only based on the CORESETPoolIndex. The above method also includes the target cell associated with the first reference signal resource in the decision criteria for HARQ-ACK codebook division.

According to one aspect of the present application, comprising:

receiving a third information block, the third information block being used to indicate the second-type identity comprised in the first information block.

In one embodiment, characteristics of the above method comprise: the third information block is used to activate a TCI-State used to receive the first resource set.

According to one aspect of the present application, comprising:

transmitting a first uplink information block, the first uplink information block being used to indicate the second-type identity comprised in the first information block.

In one embodiment, characteristics of the above method comprise: the first node directly recommends to a transmitter of the first signaling a TCI-State adopted for transmitting the first resource set, so as to facilitate a reception of the first node.

According to one aspect of the present application, comprising:

receiving a fourth information block, the fourth information block being used to indicate the second-type identity comprised in the second information block.

In one embodiment, characteristics of the above method comprise: the fourth information block is used to activate a TCI-State used to receive the second resource set.

According to one aspect of the present application, comprising:

transmitting a second uplink information block, the second uplink information block being used to indicate the second-type identity comprised in the second information block.

In one embodiment, characteristics of the above method comprise: the first node directly recommends to a transmitter of the first signaling a TCI-State adopted for transmitting the second resource set, so as to facilitate a reception of the first node.

According to one aspect of the present application, comprising:

receiving a first radio signal;

herein, the first signaling comprises configuration information of the first radio signal; the HARQ-ACK associated with the first signaling indicates whether a bit block carried by the first radio signal is correctly decoded.

According to one aspect of the present application, comprising:

receiving a second radio signal;

herein, the second signaling comprises configuration information of the second radio signal; the HARQ-ACK associated with the second signaling indicates whether a bit block carried by the second radio signal is correctly decoded.

According to one aspect of the present application, time-domain resources occupied by the first UCI are reference time-domain resources associated with a HARQ-ACK of the second signaling.

According to one aspect of the present application, the first-type identity comprised in the first information block is the same as the first-type identity comprised in the second information block; all conditions in a first condition set being satisfied is used to determine that the first UCI does not comprise a HARQ-ACK associated with the first signaling, and the first condition set comprises: the first candidate cell is different from the target cell.

In one embodiment, characteristics of the above method comprise: even if the first resource set and the second resource set use a same CORESETPoolIndex, when reference signal resources of the first resource set QCL and reference signal resources of the second resource set QCL respectively belong to different cells, a HARQ-ACK associated with a control signaling transmitted in the first resource set and a HARQ-ACK associated with a control signaling transmitted in the second resource set still need separate feedback.

In one embodiment, the above method is essential in that: when the first node receives the first resource set and the second resource set using beams from two different cells, a HARQ-ACK associated with a control signaling transmitted in the first resource set and a HARQ-ACK associated with a control signaling transmitted in the second resource set need to be fed back separately.

According to one aspect of the present application, the first condition set comprises: there does not exist two second-type identities respectively comprised in two of the K information blocks indicating a same reference signal resource associated with the target cell, and the first-type identities comprised in the two information blocks are different.

In one embodiment, the above method is essential in that: there does not exist two CORESETs using different CORESETPoolIndexes being associated with reference signal resources in a same cell, so as to avoid the first node not knowing which beam to use to receive a CORESET.

According to one aspect of the present application, HARQ-ACK(s) associated with all downlink physical-layer signalings of the target cell is(are) not fed back.

In one embodiment, the above method is essential in that: the target cell only comprises a CORESETPool, or the target cell is not configured with a CORESETPool.

According to one aspect of the present application, an offset between a reception of the first signaling and the first radio signal is less than a first offset value; a demodulation reference signal comprised in the first radio signal and a demodulation reference signal comprised in a CORESET with a minimum CORESET identity in a first target CORESET pool are QCL; the first target CORESET pool comprises a CORESET indicated by any information block in a first information block subset; the first information block subset comprises a first target information block, and the first target information block is any information block in all information blocks satisfying a first target condition set among the K information blocks; the first target condition set comprises that a first-type identity comprised in the first target information block is the same as the first-type identity comprised in the first information block; and the first target condition set comprises that the first target information block comprises at least one second-type identity, and reference signal resources indicated by the second-type identity comprised in the first target information block are associated with the target cell.

In one embodiment, the above method is essential in that: when the first UCI does not comprise a HARQ-ACK associated with the first signaling, and an offset value of the control channel and data channel is small, a CORESET to be referred by a beam used to receive the first radio signal must use a CORESETPoolIndex the same as a CORESET Pool to which the first resource set belongs, and the referred CORESET can be associated with a reference signal resource under the target cell.

According to one aspect of the present application, the first-type identity comprised in the first information block is different from the first-type identity comprised in the second information block; all conditions in a second condition set being satisfied is used to determine that the first UCI comprises a HARQ-ACK associated with the first signaling, and the second condition set comprises: the first candidate cell is the same as the target cell.

In one embodiment, the above method is essential in that: even the first resource set and the second resource set adopt different CORESETPoolIndexes, when reference signal resources of the first resource set QCL and reference signal resources of the second resource set QCL are a same cell, a HARQ-ACK associated with the first signaling and a HARQ-ACK associated with the second signaling can adopt a HARQ-ACK codebook.

According to one aspect of the present application, the second condition set comprises: there exist two second-type identities respectively comprised in two of the K information blocks indicating a same reference signal resource associated with the target cell, and the first-type identities comprised in the two information blocks are different.

According to one aspect of the present application, an offset between a reception of the first signaling and the first radio signal is less than a first offset value; a demodulation reference signal comprised in the first radio signal and a demodulation reference signal comprised in a CORESET with a minimum CORESET identity in a second target CORESET pool are QCL; the second target CORESET pool comprises a CORESET indicated by any information block in a second information block subset; the second information block subset comprises a second target information block, and the second target information block is any information block in all information blocks satisfying a second target condition set among the K information blocks; the second target condition set comprises that the second target information block comprises at least one second-type identity, and reference signal resources indicated by the second-type identity comprised in the second target information block are associated with the target cell.

In one embodiment, the above method is essential in that: when the first UCI comprises a HARQ-ACK associated with the first signaling, and when an offset value of the control channel and a data channel is small, a CORESET needed to be referred by a beam used to receive the first radio signal only needs to be able to be associated to a reference signal resource under the target cell.

The present application provides a method in a second node for wireless communications, comprising:

transmitting K information blocks, K being a positive integer greater than 1, each of the K information blocks comprising a first-type identity and at least one second-type identity, and each of the K information blocks being used to indicate a resource set;

respectively transmitting a first signaling and a second signaling in a first resource set and a second resource set; the first resource set being the resource set indicated by a first information block, the first information block being one of the K information blocks, the second resource set being the resource set indicated by a second information block, and the second information block being an information block other than the first information block among the K information blocks;

receiving first Uplink Control Information (UCI) in a physical-layer channel on a first cell, the first cell being capable of bearing a HARQ-ACK associated with the first signaling;

herein, name of the first-type identity comprises CORE-SETPoolIndex; any second-type identity comprised in the K information blocks indicates a reference signal resource; a demodulation reference signal of a channel occupied by the first signaling and a first reference signal resource are QCL, and the second-type identity comprised in the first information block indicates the reference signal resource; a demodulation reference signal of a channel occupied by the second signaling and a second reference signal resource are QCL, and the second-type identity comprised in the second information block indicates the second reference signal resource; the first reference signal resource is associated with a target cell, and the second reference signal resource is associated with a first candidate cell; the first UCI comprises a HARQ-ACK associated with a second signaling, and the first-type identity indicated by the first information block and the target cell are used together to determine whether the first UCI comprises a HARQ-ACK associated with the first signaling.

According to one aspect of the present application, comprising:

transmitting a third information block, the third information block being used to indicate the second-type identity comprised in the first information block.

According to one aspect of the present application, comprising:

receiving a first uplink information block, the first uplink information block being used to indicate the second-type identity comprised in the first information block.

According to one aspect of the present application, comprising:

transmitting a fourth information block, the fourth information block being used to indicate the second-type identity comprised in the second information block.

According to one aspect of the present application, comprising:

receiving a second uplink information block, the second uplink information block being used to indicate the second-type identity comprised in the second information block.

According to one aspect of the present application, comprising:

transmitting a first radio signal;

herein, the first signaling comprises configuration information of the first radio signal; the HARQ-ACK associated with the first signaling indicates whether a bit block carried by the first radio signal is correctly decoded.

According to one aspect of the present application, comprising:

transmitting a second radio signal;

herein, the second signaling comprises configuration information of the second radio signal; the HARQ-ACK associated with the second signaling indicates whether a bit block carried by the second radio signal is correctly decoded.

According to one aspect of the present application, time-domain resources occupied by the first UCI are reference time-domain resources associated with HARQ-ACK of the second signaling.

According to one aspect of the present application, the first-type identity comprised in the first information block is the same as the first-type identity comprised in the second information block; all conditions in a first condition set being satisfied is used to determine that the first UCI does not comprise a HARQ-ACK associated with the first signaling, and the first condition set comprises: the first candidate cell is different from the target cell.

According to one aspect of the present application, the first condition set comprises: there does not exist two second-type identities respectively comprised in two of the K information blocks indicating a same reference signal resource associated with the target cell, and the first-type identities comprised in the two information blocks are different.

According to one aspect of the present application, HARQ-ACK(s) associated with all downlink physical-layer signalings of the target cell is(are) not fed back.

According to one aspect of the present application, an offset between a reception of the first signaling and the first radio signal is less than a first offset value; a demodulation reference signal comprised in the first radio signal and a demodulation reference signal comprised in a CORESET with a minimum CORESET identity in a first target CORE-SET pool are QCL; the first target CORESET pool comprises a CORESET indicated by any information block in a first information block subset; the first information block subset comprises a first target information block, and the first target information block is any information block in all information blocks satisfying a first target condition set among the K information blocks; the first target condition set comprises that a first-type identity comprised in the first target information block is the same as the first-type identity comprised in the first information block; and the first target condition set comprises that the first target information block comprises at least one second-type identity, and reference signal resources indicated by the second-type identity comprised in the first target information block are associated with the target cell.

According to one aspect of the present application, the first-type identity comprised in the first information block is different from the first-type identity comprised in the second information block; all conditions in a second condition set being satisfied is used to determine that the first UCI comprises a HARQ-ACK associated with the first signaling, and the second condition set comprises: the first candidate cell is the same as the target cell.

According to one aspect of the present application, the second condition set comprises: there exist two second-type identities respectively comprised in two of the K information blocks indicating a same reference signal resource associated with the target cell, and the first-type identities comprised in the two information blocks are different.

According to one aspect of the present application, an offset between a reception of the first signaling and the first radio signal is less than a first offset value; a demodulation reference signal comprised in the first radio signal and a demodulation reference signal comprised in a CORESET with a minimum CORESET identity in a second target CORESET pool are QCL; the second target CORESET pool comprises a CORESET indicated by any information block in a second information block subset; the second information block subset comprises a second target information block, and the second target information block is any information block in all information blocks satisfying a second target condition set among the K information blocks; the second target condition set comprises that the second target information block comprises at least one second-type identity, and reference signal resources indicated by the second-type identity comprised in the second target information block are associated with the target cell.

The present application provides a first node for wireless communications, comprising:

a first receiver, receiving K information blocks, K being a positive integer greater than 1, each of the K information blocks comprising a first-type identity and at least one second-type identity, and each of the K information blocks being used to indicate a resource set;

a first transceiver, respectively receiving a first signaling and a second signaling in a first resource set and a second resource set; the first resource set being the resource set indicated by a first information block, the first information block being one of the K information blocks, the second resource set being the resource set indicated by a second information block, and the second information block being an information block other than the first information block among the K information blocks;

a first transmitter, transmitting first Uplink Control Information (UCI) in a physical-layer channel on a first cell, the first cell being capable of bearing a HARQ-ACK associated with the first signaling;

herein, name of the first-type identity comprises CORESETPoolIndex; any second-type identity comprised in the K information blocks indicates a reference signal resource; a demodulation reference signal of a channel occupied by the first signaling and a first reference signal resource are QCL, and the second-type identity comprised in the first information block indicates the reference signal resource; a demodulation reference signal of a channel occupied by the second signaling and a second reference signal resource are QCL, and the second-type identity comprised in the second information block indicates the second reference signal resource; the first reference signal resource is associated with a target cell, and the second reference signal resource is associated with a first candidate cell; the first UCI comprises a HARQ-ACK associated with a second signaling, and the first-type identity indicated by the first information block and the target cell are used together to determine whether the first UCI comprises a HARQ-ACK associated with the first signaling.

The present application provides a second node for wireless communications, comprising:

a second transmitter, transmitting K information blocks, K being a positive integer greater than 1, each of the K information blocks comprising a first-type identity and at least one second-type identity, and each of the K information blocks being used to indicate a resource set;

a second transceiver, respectively transmitting a first signaling and a second signaling in a first resource set and a second resource set; the first resource set being the resource set indicated by a first information block, the first information block being one of the K information blocks, the second resource set being the resource set indicated by a second information block, and the second information block being an information block other than the first information block among the K information blocks;

a second receiver, receiving first Uplink Control Information (UCI) in a physical-layer channel on a first cell, the first cell being capable of bearing a HARQ-ACK associated with the first signaling;

herein, name of the first-type identity comprises CORESETPoolIndex; any second-type identity comprised in the K information blocks indicates a reference signal resource; a demodulation reference signal of a channel occupied by the first signaling and a first reference signal resource are QCL, and the second-type identity comprised in the first information block indicates the reference signal resource; a demodulation reference signal of a channel occupied by the second signaling and a second reference signal resource are QCL, and the second-type identity comprised in the second information block indicates the second reference signal resource; the first reference signal resource is associated with a target cell, and the second reference signal resource is associated with a first candidate cell; the first UCI comprises a HARQ-ACK associated with a second signaling, and the first-type identity indicated by the first information block and the target cell are used together to determine whether the first UCI comprises a HARQ-ACK associated with the first signaling.

In one embodiment, the present application has the following advantages over conventional schemes:

according to the existing system, when a first-type identity used by the first resource set and a first-type identity used by the second resource set are the same, that is, the first resource set and the second resource set use a same CORESETPoolIndex, then a HARQ-ACK associated with a first signaling and a HARQ-ACK associated with a second signaling can use a same HARQ-ACK codebook; then in layer 1/2 mobility management, the first resource set and the second resource set may belong to different cells or reference signal resources associated with different cells are QCL, therefore, it is not enough to judge the division of HARQ-ACK codebooks only based on the CORESETPoolIndex. The above method also includes the target cell associated with the first reference signal resource in the decision criteria for HARQ-ACK codebook division;

if the first resource set and the second resource set use a same CORESETPoolIndex, when reference signal resources of the first resource set QCL and reference signal resources of the second resource set QCL respectively belong to different cells, a HARQ-ACK associated with a control signaling transmitted in the first resource set and a HARQ-ACK associated with a control signaling transmitted in the second resource set still need separate feedback;

if the first UCI does not comprise a HARQ-ACK associated with the first signaling, and an offset value of the control channel and data channel is small, a CORESET to be referred by a beam used to receive the first signaling must use a CORESETPoolIndex the same as a CORESET Pool to which the first resource set belongs, and the referred CORESET can be associated with a reference signal resource in the target cell;

further optimize based on the differentiation of HARQ-ACK codebooks, when an interval between a scheduling signaling and a Physical Downlink Shared Channel (PDSCH) is too small, beams of a PDSCH backup to a corresponding CORESET according to the differentiation of HARQ-ACK codebooks to improve performance.

BRIEF DESCRIPTION OF THE DRAWINGS

Other features, objects and advantages of the present application will become more apparent from the detailed description of non-restrictive embodiments taken in conjunction with the following drawings:

FIG. 1A illustrates a flowchart of the processing of a first node according to one embodiment of the present application;

FIG. 1B illustrates a flowchart of the processing of a first node according to one embodiment of the present application;

FIG. 2 illustrates a schematic diagram of a network architecture according to one embodiment of the present application;

FIG. 8B illustrates a flowchart of a third information block and a fourth information block according to one embodiment of the present application;

FIG. 9A illustrates a schematic diagram of a second information block according to another embodiment of the present application;

FIG. 9B illustrates a schematic diagram of K information blocks according to another embodiment of the present application;

FIG. 10A illustrates a schematic diagram of a second information block according to another embodiment of the present application;

FIG. 10B illustrates a schematic diagram of a given resource set according to one embodiment of the present application;

DESCRIPTION OF THE EMBODIMENTS

Figure 3:
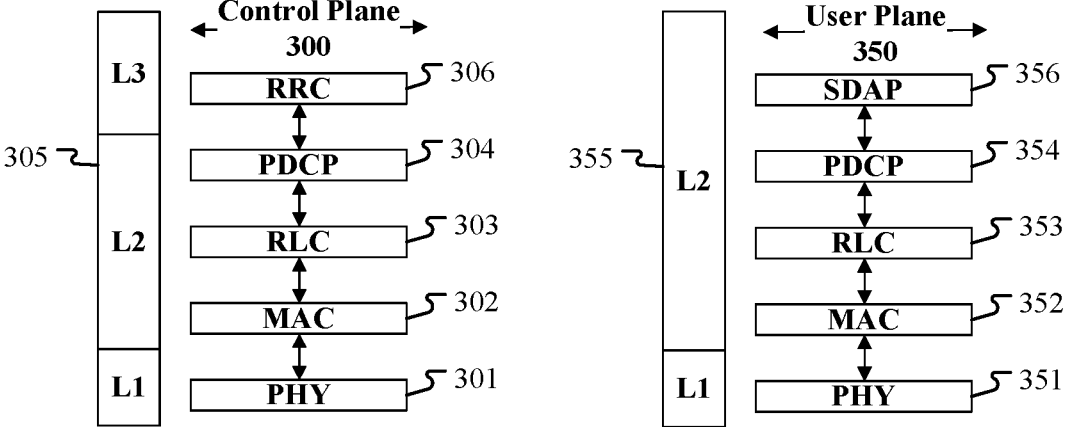
FIG. 3 illustrates a schematic diagram of a radio protocol architecture of a user plane and a control plane according to one embodiment of the present application.

The technical scheme of the present application is described below in further details in conjunction with the drawings. It should be noted that the embodiments of the present application and the characteristics of the embodiments may be arbitrarily combined if no conflict is caused.

Embodiment 1A

Embodiment 1A illustrates a flowchart of the processing of a first node, as shown in FIG. 1A. In step 100A illustrated by FIG. 1A, each box represents a step. In embodiment 1A, a first node in the present application receives a first information block and a second information block in step 101A; in step 102A, monitors a first signaling in a first time-frequency resource set; in step 103A, receives a first signal in a second time-frequency resource set.

In embodiment 1A, the first information block indicates target reference signal resources; a demodulation reference signal of a channel occupied by the first signaling and the target reference signal resources are QCL, the first signaling comprises a first field, the first field in the first signaling indicates a first reference signal resource from a first reference signal resource set, and a demodulation reference signal of a channel occupied by the first signal and the first reference signal resource are QCL; the second information block indicates L candidate reference signal resource sets, L being a positive integer greater than 1, and the first reference signal resource set is one of the L candidate reference signal resource sets; the target reference signal resource is associated with one of L identities, the L identities are respectively associated with the L candidate reference signal resource sets, the first reference signal resource set is a candidate reference signal resource set associated with a first identity among the L candidate reference signal resource sets, and the first identity is an identity associated with the target reference signal resource among the L identities.

In one embodiment, the first information block comprises an indication of TCI State for UE-specific PDDCH in Technical Specification (TS) 38.321.

In one embodiment, the first information block is a MAC CE.

In one embodiment, the first information block comprises a MAC CE.

In one embodiment, the second information block comprises Activation/Deactivation of UE-specific PDSCH TCI State in TS 38. 321.

In one embodiment, the second information block is a MAC CE.

In one embodiment, the second information block comprises a MAC CE.

In one embodiment, the first time-frequency resource set comprises a CORESET.

In one embodiment, the first time-frequency resource set is associated with a CORESET ID.

In one embodiment, the first time-frequency resource set comprises more than one Resource Element (RE).

In one embodiment, the first time-frequency resource set comprises a CORESET pool.

In one embodiment, the first time-frequency resource set is associated with a CORESET pool ID.

In one embodiment, the first time-frequency resource set comprises a Search Space Set.

In one embodiment, the first time-frequency resource set is associated with a search space set ID.

In one embodiment, the first time-frequency resource set comprises a Search Space.

In one embodiment, the first time-frequency resource set comprises a Search Space Set Pool.

In one embodiment, the first time-frequency resource set is associated with a search space set pool ID.

In one embodiment, a physical-layer channel bearing the first signaling comprises a PDCCH.

In one embodiment, the first signaling is a DCI.

In one embodiment, the first signaling is a Downlink Grant.

In one embodiment, the first signaling is used to schedule the first signal.

In one embodiment, the monitoring comprises Blind detecting.

In one embodiment, the monitoring includes a Cyclic Redundancy Check (CRC).

In one embodiment, the monitoring comprises receiving.

In one embodiment, the monitoring comprises demodulating.

In one embodiment, the monitoring comprises coherently detecting.

In one embodiment, the monitoring comprises energy detecting.

In one embodiment, the first signaling is used to indicate the second time-frequency resource set.

In one embodiment, the first signaling is used to indicate a position of an Orthogonal Frequency Division Multiplexing (OFDM) symbol occupied by the second time-frequency resource set.

In one embodiment, the first signaling is used to indicate a position of a subcarrier occupied by the second time-frequency resource set.

In one embodiment, the second time-frequency resource set comprises more than one RE.

In one embodiment, the first signal is a radio signal.

In one embodiment, the first signal is a baseband signal.

In one embodiment, a physical-layer channel bearing the first signal comprises a PDCCH.

In one embodiment, the first signal is generated through a Transmission Block (TB).

In one embodiment, the target reference signal resource comprises at least one of Channel State Information-Reference Signal (CSI-RS) resources or an SSB.

In one embodiment, the target reference signal resource comprises at least one of CSI-RSs or an SSB.

In one embodiment, the target reference signal resource comprises at least one of a CSI-RS resource identity or an SSB index.

In one embodiment, the target reference signal resource comprises a CSI-RS resource set identity.

In one embodiment, the meaning of the above phrase that a demodulation reference signal of a channel occupied by the first signal and the target reference signal resource are QCL comprises: a Spatial Rx Parameter of the target reference signal resource is used for a reception of a demodulation reference signal of a channel occupied by the first signaling.

In one embodiment, the meaning of the above phrase that a demodulation reference signal of a channel occupied by the first signal and the target reference signal resource are QCL comprises: a Spatial Rx Parameter of the target reference signal resource is used for a reception of the first signaling.

In one embodiment, the meaning of the above phrase that a demodulation reference signal of a channel occupied by the first signal and the target reference signal resource are QCL comprises: the first node adopts a same beam to receive the target reference signal resource and a demodulation reference signal of a channel occupied by the first signaling.

In one embodiment, the meaning of the above phrase that a demodulation reference signal of a channel occupied by the first signal and the target reference signal resource are QCL comprises: the target reference signal resource is used for a reception of the first signaling.

In one embodiment, the target reference signal resource corresponds to a TCI-State.

In one embodiment, the meaning of the QCL is Quasi Co-located (QCL).

In one embodiment, a type of the QCL comprises QCL Type D.

In one embodiment, a type of the QCL comprises QCL Type A.

In one embodiment, a type of the QCL comprises QCL Type B.

In one embodiment, a type of the QCL comprises QCL Type C.

In one embodiment, a first field comprised in the first signaling is a TCI field in a PDCCH.

In one embodiment, a first fled comprised in the first signaling is a TCI field in DCI.

In one embodiment, the first reference signal resource set comprises K1 reference signal resources, K1 being a positive integer greater than 1.

In one subembodiment of the above embodiment, K1 is equal to 8.

In one subembodiment of the above embodiment, the K1 reference signal resources respectively correspond to K1 TCI states.

In one subembodiment of the above embodiment, there at least exists one of the K1 reference signal resources comprising at least one of a CSI-RS resource or an SSB.

In one subembodiment of the above embodiment, there at least exists one of the K1 reference signal resources corresponding to at least one of a CSI-RS or an SSB.

In one subembodiment of the above embodiment, there at least exists one of the K1 reference signal resources corresponding to at least one of a CSI-RS resource identity or an SSB identity.

In one subembodiment of the above embodiment, there at least exists one of the K1 reference signal resources corresponding a CSI-RS resource set identity.

In one embodiment, the meaning of the above phrase that a demodulation reference signal of a channel occupied by the first signal and the first reference signal resource are QCL comprises: a Spatial Rx Parameter of the first reference signal resource is used for a reception of a demodulation reference signal of a channel occupied by the first signal.

In one embodiment, the meaning of the above phrase that a demodulation reference signal of a channel occupied by the first signal and the first reference signal resource are QCL comprises: a Spatial Rx Parameter of the first reference signal resource is used for a reception of the first signal.

In one embodiment, the meaning of the above phrase that a demodulation reference signal of a channel occupied by the first signal and the first reference signal resource are QCL comprises: the first node adopts a same beam to receive the first reference signal resource and a demodulation reference signal of a channel occupied by the first signal.

In one embodiment, the meaning of the above phrase that a demodulation reference signal of a channel occupied by the first signal and the first reference signal resource are QCL comprises: the first reference signal resource is used for a reception of the first signal.

In one embodiment, L is 2.

In one embodiment, L is greater than 2 and does not exceed 64.

In one embodiment, the first information block and the second information block respectively comprise a MAC-layer signaling.

In one embodiment, the first information block comprises a MAC CE, and the second information block comprises a MAC CE.

In one embodiment, the first information block comprises a MAC CE, the second information block comprises L MAC CEs, and the L MAC CEs respectively indicate the L candidate reference signal resource sets.

In one embodiment, a given candidate reference signal resource set is any of the L candidate reference signal resource sets, and the given candidate reference signal resource set comprises K2 candidate reference signal resources, K2 being a positive integer greater than 1.

In one subembodiment of the above embodiment, K2 is equal to 8.

In one subembodiment of the above embodiment, K2 is not greater than 8.

In one subembodiment of the above embodiment, the K2 candidate reference signal resources respectively correspond to K2 TCI states.

In one subembodiment of the above embodiment, there at least exists one of the K2 candidate reference signal resources comprising at least one of a CSI-RS resource or an SSB.

In one subembodiment of the above embodiment, there at least exists one of the K2 candidate reference signal resources corresponding to at least one of a CSI-RS or an SSB.

In one subembodiment of the above embodiment, there at least exists one of the K2 candidate reference signal resources corresponding to at least one of a CSI-RS resource identity or an SSB identity.

In one subembodiment of the above embodiment, there at least exists one of the K2 candidate reference signal resources corresponding a CSI-RS resource set identity.

In one embodiment, the meaning of the above phrase that the target reference signal resource is associated with one of L identities comprises: the first information block indicating the target reference signal resource is also used to indicate the identity associated with the target reference signal resource in the L identities.

In one embodiment, the meaning of the above phrase that the target reference signal resource is associated with one of L identities comprises: the target reference signal resource is associated with a TCI state, RRC configuration information of the TCI state also comprises a given identity associated with the target reference signal resource, and the given identity is one of the L identities.

In one embodiment, the meaning of the above phrase that the target reference signal resource is associated with one of L identities comprises: the target reference signal resource is associated with a CSI-RS resource, RRC configuration information of the CSI-RS resource also comprises a given identity associated with the target reference signal resource, and the given identity is one of the L identities.

In one embodiment, any of the L identities is a Physical Cell Identity (PCI).

In one embodiment, any of the L identities is a CellGroupId.

In one embodiment, any of the L identities is a PhysicalCellGroupId.

In one embodiment, a number of bits occupied by any of the L identities is greater than 5.

In one embodiment, a number of bits occupied by any of the L identities is equal to 16.

Embodiment 1B

Embodiment 1B illustrates a flowchart of the processing of a first node, as shown in FIG. 1B. In step 100B illustrated by FIG. 1B, each box represents a step. In Embodiment 1, a first node in the present application receives K information blocks in step 101B; respectively receives a first signaling and a second signaling in a first resource set and a second resource set in step 102B; transmits a first UCI in a physical-layer channel on a first cell in step 103B.

In embodiment 1B, K is a positive integer greater than 1, each of the K information blocks comprises a first-type identity and at least one second-type identity, and each of the K information blocks is used to indicate a resource set; the first resource set is the resource set indicated by a first information block, the first information block is one of the K information blocks, the second resource set is the resource set indicated by a second information block, and the second information block is an information block other than the first information block among the K information blocks; the first cell is capable of bearing a HARQ-ACK associated with the first signaling; name of the first-type identity comprises CORESETPoolIndex; any second-type identity comprised in the K information blocks indicates a reference signal resource; a demodulation reference signal of a channel occupied by the first signaling and a first reference signal resource are QCL, and the second-type identity comprised in the first information block indicates the reference signal resource; a demodulation reference signal of a channel occupied by the second signaling and a second reference signal resource are QCL, and the second-type identity comprised in the second information block indicates the second reference signal resource; the first reference signal resource is associated with a target cell, and the second reference signal resource is associated with a first candidate cell; the first UCI comprises a HARQ-ACK associated with a second signaling, and the first-type identity indicated by the first information block and the target cell are used together to determine whether the first UCI comprises a HARQ-ACK associated with the first signaling.

In one embodiment, any of the K information blocks is beared through an RRC IE.

In one embodiment, any of the K information blocks is an RRC signaling.

In one embodiment, any of the K information blocks is a higher-layer signaling.

In one embodiment, the K information blocks are respectively used to indicate K Control Resource Sets (CORESETs).

In one embodiment, the first resource set occupies a positive integer number of RE(s).

In one embodiment, the first resource set comprises a CORESET.

In one embodiment, the first resource set is a CORESET.

In one embodiment, the second resource group set occupies a positive integer number of RE(s).

In one embodiment, the second resource set comprises a CORESET.

In one embodiment, the second resource set is a CORESET.

In one embodiment, a physical-layer channel transmitting the first signaling comprises a Physical Downlink Control Channel (PDCCH).

In one embodiment, a physical-layer channel transmitting the second signaling comprises a PDCCH.

In one embodiment, the first signaling comprises a DCI.

In one embodiment, the second signaling comprises a DCI.

In one embodiment, the first signaling and the second signaling are respectively a physical-layer signaling.

In one embodiment, the first signaling and the second signaling are respectively a DCI.

In one embodiment, the first signaling is a DCI used for downlink Grant.

In one embodiment, the second signaling is a DCI used for downlink Grant.

In one embodiment, the first signaling indicates a Semi-Persistent Scheduling (SPS) activation, and the HARQ-ACK associated with the first signaling indicates whether the first signaling is correctly decoded.

In one embodiment, the first signaling indicates an SPS de-activation, and the HARQ-ACK associated with the first signaling indicates whether the first signaling is correctly received.

In one embodiment, the second signaling indicates an SPS activation, and the HARQ-ACK associated with the second signaling indicates whether the second signaling is correctly decoded.

In one embodiment, the second signaling indicates an SPS de-activation, and the HARQ-ACK associated with the second signaling indicates whether the second signaling is correctly decoded.

In one embodiment, a name of the first-type identity comprises r-16.

In one embodiment, a name of the first-type identity comprises r-17.

In one embodiment, the first-type identity is a CORE-SETPoolIndex.

In one embodiment, the first-type identity is used to identify a CORESET pool.

In one embodiment, the first-type identity is equal to 0 or 1.

In one embodiment, the first-type identity is a non-negative integer.

In one embodiment, the first-type identity is used to identify a TRP.

In one embodiment, the second-type identity is used to indicate a TCI-State.

In one embodiment, the second-type identity comprises a TCI-StateId.

In one embodiment, the second-type identity is a non-negative integer.

In one embodiment, the second-type identity occupies more than one bit.

In one embodiment, the second-type identity comprises a Physical Cell Identity (PCI).

In one embodiment, the second-type identity comprises a ServCellIndex.

In one embodiment, the second-type identity comprises a ServCellIndex.

In one embodiment, the K information blocks comprise all IEs currently received by the first node for configuring a CORESET.

In one embodiment, the first cell corresponds to a PCI.

In one embodiment, the first cell corresponds to a Serv-CellIndex.

In one embodiment, the first cell corresponds to a Serv-CellIndex.

In one embodiment, the first node transmits the first UCI on a Physical Uplink Control Channel (PUCCH) of the first cell.

In one embodiment, the first node transmits the first UCI on a Physical Uplink Shared Channel (PUSCH) of the first cell.

In one embodiment, the meaning of the above phrase that the first cell is capable of bearing a HARQ-ACK associated with the first signaling comprises: the first cell schedules a reception of a data channel of the first node through the first signaling, and the first node feeds back a HARQ-ACK of the data channel to the first cell.

In one embodiment, the meaning of the above phrase that the first cell is capable of bearing a HARQ-ACK associated with the first signaling comprises: the first cell indicates an SPS activation through the first signaling, and the first node feeds back the HARQ-ACK indicating whether the first signaling is correctly received to the first cell.

In one embodiment, the meaning of the above phrase that the first cell is capable of bearing a HARQ-ACK associated with the first signaling comprises: the first cell indicates an SPS de-activation through the first signaling, and the first node feeds back the HARQ-ACK indicating whether the first signaling is correctly received to the first cell.

In one embodiment, the first information block comprises Q1 second-type identities, Q1 being a positive integer greater than 1.

In one subembodiment of the above embodiment, Q1 is not greater than 8.

In one subembodiment of the above embodiment, Q1 is not greater than 64.

In one subembodiment of the above embodiment, Q1 is not greater than 128.

In one embodiment, the first information block only comprises a second-type identity.

In one embodiment, any second-type identity comprised in the first information block is used to indicate a TCI-State.

In one embodiment, any second-type identity comprised in the first information block comprises a TCI-StateId.

In one embodiment, the second information block comprises Q2 second-type identities, Q2 being a positive integer greater than 1.

In one subembodiment of the above embodiment, Q2 is not greater than 8.

In one subembodiment of the above embodiment, Q2 is not greater than 64.

In one subembodiment of the above embodiment, Q2 is not greater than 128.

In one embodiment, the second information block only comprises a second-type identity.

In one embodiment, any second-type identity comprised in the second information block is used to indicate a TCI-State.

In one embodiment, any second-type identity comprised in the second information block comprises a TCI-StateId.

In one embodiment, the reference signal resource indicated by the second-type identity comprises at least one of a Channel State Information-Reference Signal (CSI-RS) resource or a Synchronization Signal/physical broadcast channel Block (SSB).

In one embodiment, the reference signal resource indicated by the second-type identity comprises at least one of a CSI-RS or an SSB.

In one embodiment, the reference signal resource indicated by the second-type identity is associated with a CSI-RS resource identity or an SSB index.

In one embodiment, the reference signal resource indicated by the second-type identity comprises a CSI-RS resource set identity.

In one embodiment, the meaning of the above phrase that a demodulation reference signal of a channel occupied by the first signaling and a first reference signal are QCL comprises: a Spatial Rx Parameter of the first reference signal resource is used for a reception of a demodulation reference signal of a channel occupied by the first signaling.

In one embodiment, the meaning of the above phrase that a demodulation reference signal of a channel occupied by the first signaling and a first reference signal are QCL comprises: a Spatial Rx Parameter of the first reference signal resource is used for a reception of the first signaling.

In one embodiment, the meaning of the above phrase that a demodulation reference signal of a channel occupied by the first signaling and a first reference signal are QCL comprises: the first node adopts a same beam to receive the first reference signal resource and a demodulation reference signal of a channel occupied by the first signaling.

In one embodiment, the meaning of the above phrase that a demodulation reference signal of a channel occupied by the first signaling and a first reference signal are QCL comprises: the first reference signal resource is used for a reception of the first signaling.

In one embodiment, the meaning of the above phrase that a demodulation reference signal of a channel occupied by the second signaling and a second reference signal are QCL comprises: a Spatial Rx Parameter of the second reference signal resource is used for a reception of a demodulation reference signal of a channel occupied by the second signal.

In one embodiment, the meaning of the above phrase that a demodulation reference signal of a channel occupied by the second signaling and a second reference signal are QCL comprises: a Spatial Rx Parameter of the second reference signal resource is used for a reception of the second signaling.

In one embodiment, the meaning of the above phrase that a demodulation reference signal of a channel occupied by the second signaling and a second reference signal are QCL comprises: the first node adopts a same beam to receive the second reference signal resource and a demodulation reference signal of a channel occupied by the second signaling.

In one embodiment, the meaning of the above phrase that a demodulation reference signal of a channel occupied by the second signaling and a second reference signal are QCL comprises: the second reference signal resource is used for a reception of the second signaling.

In one embodiment, the first reference signal resource comprises at least one of a CSI-RS resource or an SSB.

In one embodiment, the first reference signal resource comprises at least one of a CSI-RS or an SSB.

In one embodiment, the first reference signal resource is associated with a CSI-RS resource identity or an SSB index.

In one embodiment, the first reference signal resource comprises a CSI-RS resource set identity.

In one embodiment, the second reference signal resource comprises at least one of a CSI-RS resource or an SSB.

In one embodiment, the second reference signal resource comprises at least one of a CSI-RS or an SSB.

In one embodiment, the second reference signal resource is associated with a CSI-RS resource identity or an SSB index.

In one embodiment, the second reference signal resource comprises a CSI-RS resource set identity.

In one embodiment, the meaning of the phrase that the second-type identity comprised in the first information block indicates the first reference signal resource comprises: the first information block comprises multiple TCI-States, and one of the multiple TCI-States indicates the first reference signal resource.

In one embodiment, the meaning of the phrase that the second-type identity comprised in the second information block indicates the second reference signal resource comprises: the second information block comprises multiple TCI-States, and one of the multiple TCI-States indicates the second reference signal resource.

In one embodiment, the first UCI is transmitted on a physical-layer channel.

In one embodiment, the first UCI is transmitted on a physical-layer control channel.

In one embodiment, the first UCI is transmitted on a physical-layer data channel.

In one embodiment, the first UCI is transmitted on a PUCCH.

In one embodiment, the first UCI is transmitted on a PUSCH.

In one embodiment, a PCI adopted by the target cell is different from a PCI adopted by the first candidate cell.

In one embodiment, the first candidate cell is a camping cell of the first node.

In one embodiment, the target cell is an adjacent cell of a camping cell of the first node.

In one embodiment, the meaning of the above phrase that the first reference signal resource is associated with a target cell comprises: the first reference signal resource is configured by the target cell.

In one embodiment, the meaning of the above phrase that the first reference signal resource is associated with a target cell comprises: the first reference signal resource is transmitted by the target cell.

In one embodiment, the meaning of the above phrase that the first reference signal resource is associated with a target cell comprises: the first reference signal resource and an SSB transmitted by the target cell are QCL.

In one embodiment, the meaning of the above phrase that the first reference signal resource is associated with a target cell comprises: configuration information of the first reference signal resource comprises a cell identity of the target cell, and the cell identity comprises a PCI, or the cell identity comprises a ServCellIndex.

In one embodiment, the meaning of the above phrase that the first reference signal resource is associated with a target cell comprises: a cell identity of the target cell is used to generate an RS sequence in the first reference signal resource.

In one embodiment, the meaning of the above phrase that the second reference signal resource is associated with a first candidate cell comprises: the second reference signal resource is configured by the first candidate cell.

In one embodiment, the meaning of the above phrase that the second reference signal resource is associated with a first candidate cell comprises: the second reference signal resource is transmitted by the first candidate cell.

In one embodiment, the meaning of the above phrase that the second reference signal resource is associated with a first candidate cell comprises: the second reference signal resource and an SSB transmitted by the first candidate cell are QCL.

In one embodiment, the meaning of the above phrase that the second reference signal resource is associated with a first candidate cell comprises: configuration information of the second reference signal resource comprises a cell identity of the first candidate cell, and the cell identity comprises a PCI, or the cell identity comprises a ServCellIndex.

In one embodiment, the meaning of the above phrase that the second reference signal resource is associated with a first candidate cell comprises: a cell identity of the first candidate cell is used to generate a Reference Signal (RS) sequence in the second reference signal resource.

In one embodiment, the meaning of the above phrase that the first cell is capable of bearing a HARQ-ACK associated with the first signaling comprises: information capable of bearing the HARQ-ACK associated with the first signaling can only be transmitted on the first cell.

In one subembodiment of the above embodiment, the information bearing the HARQ-ACK associated with the first signaling comprises UCI.

In one embodiment, the meaning of the above phrase that the first cell is capable of bearing a HARQ-ACK associated with the first signaling comprises: the HARQ-ACK associated with the first signaling is capable of being transmitted on a PUCCH of the first cell or a PUSCH of other cells.

In one embodiment, the meaning of the above phrase that the first cell is capable of bearing a HARQ-ACK associated with the first signaling comprises: the HARQ-ACK associated with the first signaling is capable of being transmitted on a PUSCH of the first cell.

In one embodiment, the meaning of the above phrase that the first cell is capable of bearing a HARQ-ACK associated with the first signaling comprises: the first signaling is a DCI used to schedule a terminal in the target cell, and a PUCCH occupied by a HARQ-ACK associated with the first signaling is only configured on the first cell.

In one embodiment, the meaning of the above phrase that the first cell is capable of bearing a HARQ-ACK associated with the first signaling comprises: the first signaling is a DCI used to schedule a terminal in the target cell, the target cell and the first cell belong to a first cell group at the same time, the first cell group at least comprises 2 cells, the target cell is a Secondary Cell in the first cell, and the first cell is a Primary cell in the first cell group.

In one embodiment, for the resource set indicated by any of the K information blocks, a HARQ-ACK associated with a downlink signaling transmitted in the resource set is capable of being configured to be transmitted on the first cell.

In one embodiment, for the resource set indicated by any of the K information blocks, a PUCCH corresponding to a HARQ-ACK associated with a downlink signaling transmitted in the resource set is capable of being configured on the first cell.

In one subembodiment of the above two embodiments, the above configuration is executed through a MAC layer signaling.

In one embodiment, reference time-domain resources of a HARQ-ACK associated with the first signaling and reference time-domain resources of a HARQ-ACK associated with the second signaling are partially overlapping.

In one embodiment, reference time-domain resources of a HARQ-ACK associated with the first signaling and reference time-domain resources of a HARQ-ACK associated with the second signaling belong to a same slot.

In one subembodiment of the above embodiment, the MAC layer transmits a transport block to the physical layer at each slot.

In one subembodiment of the above embodiment, a duration of the slot does not exceed 1 ms.

In one subembodiment of the above embodiment, the slot comprises 14 OFDM symbols.

In one embodiment, reference time-domain resources of a HARQ-ACK associated with the first signaling and reference time-domain resources of a HARQ-ACK associated with the second signaling belong to a same sub-slot.

In one subembodiment of the above embodiment, the MAC layer transmits a transport block to the physical layer at each sub-slot.

In one subembodiment of the above embodiment, multiple sub-slots consist of a slot.

In one subembodiment of the above embodiment, a number of OFDM symbol(s) comprised in the sub-slot does not exceed 7.

In one embodiment, a given signaling indicates the reference time-domain resources of a HARQ-ACK associated with the given signaling, and the given signaling is the first signaling or the second signaling.

In one subembodiment of the above embodiment, a PDSCH-to-HARQJeedback timing indicator field in the given signaling indicates the reference time-domain resources of a HARQ-ACK associated with the given signaling.

In one embodiment, a time interval between the reference time-domain resources of a HARQ-ACK associated with a given signaling and time-domain resources occupied by the given signaling is indicated by a higher-layer signaling, and the given signaling is the first signaling or the second signaling.

In one subembodiment of the embodiment, the higher-layer signaling comprises a PUCCH-config IE.

In one subembodiment of the embodiment, the higher-layer signaling comprises a dl-DataToUL-ACK field.

In one subembodiment of the embodiment, the higher-layer signaling comprises a dl-DataToUL-ACK-r17 field.

In one subembodiment of the embodiment, the higher-layer signaling comprises a dl-DataToUL-ACK-DCI-1-2-r17 field.

In one subembodiment of the embodiment, a name of the higher-layer signaling comprises dl-DataToUL-ACK.

In one embodiment, a Bandwidth Part (BWP) occupied by the first UCI is the same as a BWP used to bear a HARQ-ACK associated with the first signaling.

In one embodiment, the target cell belongs to a Secondary Cell Group (SCG).

In one embodiment, a transmitting cell of the K information blocks is different from the target cell.

In one embodiment, a transmitting cell of the K information blocks and the first cell belong to a same cell group.

In one embodiment, the first candidate cell and the first cell belong to a same cell group.

In one subembodiment of the above two embodiments, the same cell group is a Master Cell Group (MCG).

In one subembodiment of the above two embodiments, the same cell group is an SCG.

In one embodiment, the transmitting cell of the K information blocks belongs to an MCG, and the target cell belongs to an SCG.

In one embodiment, the transmitting cell of the K information blocks belongs to an SCG, and the target cell belongs to an MCG.

In one embodiment, each of the K information blocks comprises a ControlResourceSet IE in an RRC signaling.

In one embodiment, each of the K information blocks comprises a ControlResourceSet-r17 IE in an RRC signaling.

In one embodiment, each of the K information blocks comprises an IE in an RRC signaling, and a name of the IE comprises ControlResourceSet.

In one embodiment, each of the K information blocks comprises an RRC-layer message.

In one embodiment, each of the K information blocks comprises a higher-layer signaling.

In one embodiment, the HARQ-ACK associated with a given signaling indicates whether a data channel scheduled by the given signaling is correctly received, and the given signaling is the first signaling or the second signaling.

In one embodiment, the HARQ-ACK associated with a given signaling indicates whether the given signaling is correctly received, and the given signaling is the first signaling or the second signaling.

In one embodiment, when a reference signal resource is transmitted by a cell, the reference signal resource is associated with the cell.

In one embodiment, when a reference signal resource and an SSB transmitted by a cell are QCL, the reference signal resource is associated with the cell.

In one embodiment, when configuration information of a reference signal resource comprises a cell identity of a cell, the reference signal resource is associated with the cell.

In one embodiment, when a cell identity of a cell is used to generate an RS sequence in a reference signal resource, the reference signal resource is associated with the cell.

In one embodiment, a type of the QCL in the present application comprises QCL Type D.

In one embodiment, a type of the QCL in the present application comprises QCL Type A.

In one embodiment, a type of the QCL in the present application comprises QCL Type B.

In one embodiment, a type of the QCL in the present application comprises QCL Type C.

In one embodiment, the cell identity in the present application comprises a PCI of the cell.

In one embodiment, the cell identity in the present application comprises a ServCellId of the cell.

Embodiment 2

Embodiment 2 illustrates a schematic diagram of a network architecture, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise UE 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 201 is a terminal with a capability to trigger L1/L2 inter-cell handover.

In one embodiment, the UE 201 is a terminal with a capability of monitoring multiple beams at the same time.

In one embodiment, the UE 201 is a terminal supporting Massive-MIMO.

In one embodiment, the UE 201 is a terminal supporting Vehicle-to-Everything (V2X).

In one embodiment, the gNB 203 corresponds to the second node in the present application.

In one embodiment, the gNB 203 supports L1/L2 inter-cell handover functions.

In one embodiment, the gNB 203 supports a transmission of multi-beam.

In one embodiment, the gNB 203 supports a transmission based on Massive-MIMO.

Embodiment 3

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X) is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of the link between the first communication node and the second communication node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and also provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the PDCP 304 of the second communication node is used for generating scheduling of the first communication node.

In one embodiment, the PDCP 354 of the second communication node is used for generating scheduling of the first communication node.

In one embodiment, the first information block in the present application is generated by the PHY 301 or the PHY 351.

In one embodiment, the first information block in the present application is generated by the MAC 302 or the MAC 352.

In one embodiment, the second information block in the present application is generated by the PHY 301 or the PHY 351.

In one embodiment, the second information block in the present application is generated by the MAC 302 or the MAC 352.

In one embodiment, the first signaling in the present application is generated by the PHY 301 or the PHY 351.

In one embodiment, the first signaling in the present application is generated by the MAC 302 or the MAC 352.

In one embodiment, the first signal in the present application is generated by the PHY 301 or the PHY 351.

In one embodiment, the first signal in the present application is generated by the MAC 302 or the MAC 352.

In one embodiment, the first signal in the present application is generated by the RRC 306.

In one embodiment, the third information block in the present application is generated by the RRC 306.

In one embodiment, the fourth information block in the present application is generated by the RRC 306.

In one embodiment, the first node is a terminal.

In one embodiment, the second node is a terminal.

In one embodiment, the second node is a Road Side Unit (RSU).

In one embodiment, the second node is a Grouphead.

In one embodiment, the second node is a Transmitter Receiver Point (TRP).

In one embodiment, the second node is a cell.

In one embodiment, the second node is an eNB.

In one embodiment, the second node is a base station.

Embodiment 4

Figure 4:
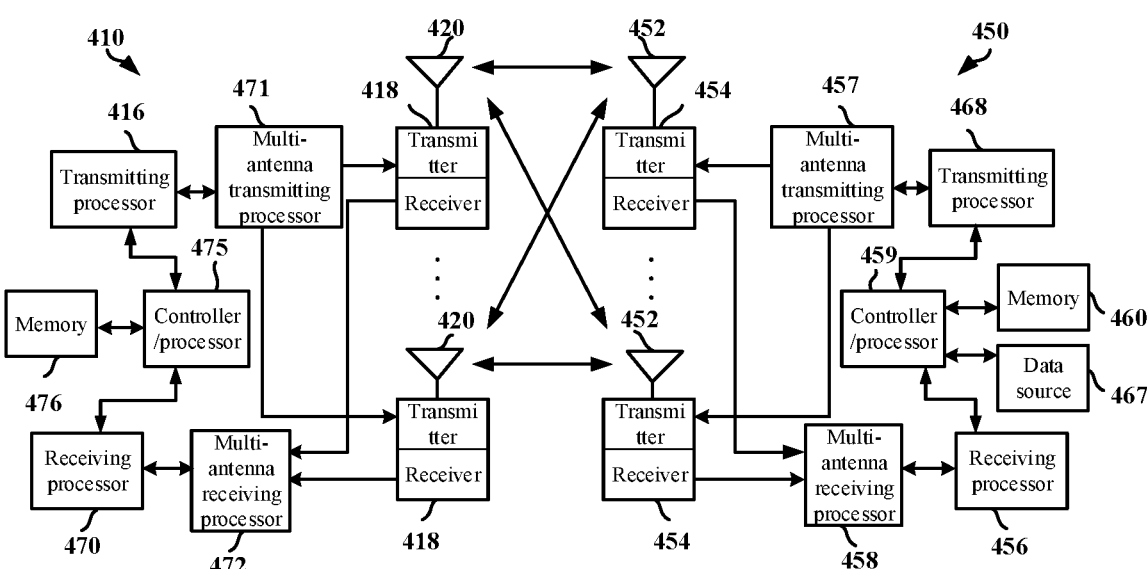
FIG. 4 illustrates a schematic diagram of a first communication device and a second communication device according to one embodiment of the present application.

Embodiment 4 illustrates a schematic diagram of a first communication device and a second communication device in the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: first receives a first information block and a second information block; and then monitors a first signaling in a first time-frequency resource set; then receives a first signal in a second time-frequency resource set; the first information block indicates target reference signal resources; a demodulation reference signal of a channel occupied by the first signaling and the target reference signal resources are QCL, the first signaling comprises a first field, the first field in the first signaling indicates a first reference signal resource from a first reference signal resource set, and a demodulation reference signal of a channel occupied by the first signal and the first reference signal resource are QCL; the second information block indicates L candidate reference signal resource sets, L being a positive integer greater than 1, and the first reference signal resource set is one of the L candidate reference signal resource sets; the target reference signal resource is associated with one of L identities, the L identities are respectively associated with the L candidate reference signal resource sets, the first reference signal resource set is a candidate reference signal resource set associated with a first identity among the L candidate reference signal resource sets, and the first identity is an identity associated with the target reference signal resource among the L identities.

In one embodiment, the first communication device 450 comprises at least one processor and at least one memory. a memory that stores a computer readable instruction program. The computer readable instruction program generates an action when executed by at least one processor. The action includes: first receiving a first information block and a second information block; and then monitoring a first signaling in a first time-frequency resource set; then receiving a first signal in a second time-frequency resource set; the first information block indicates target reference signal resources; a demodulation reference signal of a channel occupied by the first signaling and the target reference signal resources are QCL, the first signaling comprises a first field, the first field in the first signaling indicates a first reference signal resource from a first reference signal resource set, and a demodulation reference signal of a channel occupied by the first signal and the first reference signal resource are QCL; the second information block indicates L candidate reference signal resource sets, L being a positive integer greater than 1, and the first reference signal resource set is one of the L candidate reference signal resource sets; the target reference signal resource is associated with one of L identities, the L identities are respectively associated with the L candidate reference signal resource sets, the first reference signal resource set is a candidate reference signal resource set associated with a first identity among the L candidate reference signal resource sets, and the first identity is an identity associated with the target reference signal resource among the L identities.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: first transmits a first information block and a second information block; then transmits a first signaling in a first time-frequency resource set; and then transmits a first signal in a second time-frequency resource set; and the first information block indicates target reference signal resources; a demodulation reference signal of a channel occupied by the first signaling and the target reference signal resources are QCL, the first signaling comprises a first field, the first field in the first signaling indicates a first reference signal resource from a first reference signal resource set, and a demodulation reference signal of a channel occupied by the first signal and the first reference signal resource are QCL; the second information block indicates L candidate reference signal resource sets, L being a positive integer greater than 1, and the first reference signal resource set is one of the L candidate reference signal resource sets; the target reference signal resource is associated with one of L identities, the L identities are respectively associated with the L candidate reference signal resource sets, the first reference signal resource set is a candidate reference signal resource set associated with a first identity among the L candidate reference signal resource sets, and the first identity is an identity associated with the target reference signal resource among the L identities.

In one embodiment, the second communication device 410 comprises a memory that stores a computer readable instruction program. The computer readable instruction program generates an action when executed by at least one processor. The action includes: first transmitting a first information block and a second information block; then transmitting a first signaling in a first time-frequency resource set; and then transmitting a first signal in a second time-frequency resource set; and the first information block indicates target reference signal resources; a demodulation reference signal of a channel occupied by the first signaling and the target reference signal resources are QCL, the first signaling comprises a first field, the first field in the first signaling indicates a first reference signal resource from a first reference signal resource set, and a demodulation reference signal of a channel occupied by the first signal and the first reference signal resource are QCL; the second information block indicates L candidate reference signal resource sets, L being a positive integer greater than 1, and the first reference signal resource set is one of the L candidate reference signal resource sets; the target reference signal resource is associated with one of L identities, the L identities are respectively associated with the L candidate reference signal resource sets, the first reference signal resource set is a candidate reference signal resource set associated with a first identity among the L candidate reference signal resource sets, and the first identity is an identity associated with the target reference signal resource among the L identities.

In one embodiment, the first communication device 450 corresponds to a first node in the present application.

In one embodiment, the second communication device 410 corresponds to a second node in the present application.

In one embodiment, the first communication device 450 is a UE.

In one embodiment, the first communication device 450 is a terminal.

In one embodiment, the second communication device 410 is a base station.

In one embodiment, the second communication device 410 is a UE.

In one embodiment, the second communication device 410 is a network device.

In one embodiment, the second communication device 410 is a serving cell.

In one embodiment, the second communication device 410 is a TRP.

In one embodiment, at least first four of the antenna 452, the receiver 454, the multi-antenna receiving processor 458, the receiving processor 456 and the controller/processor 459 are used to receive a first information block and a second information block; at least first four of the antenna 420, the transmitter 418, the multi-antenna transmitting processor 471, the transmitting processor 416 and the controller/processor 475 are used to transmit a first information block and a second information block.

In one embodiment, at least first four of the antenna 452, the receiver 454, the multi-antenna receiving processor 458, the receiving processor 456 and the controller/processor 459 are used to monitor a first signaling in a first time-frequency resource set; at least first four of the antenna 420, the transmitter 418, the multi-antenna transmitting processor 471, the transmitting processor 416 and the controller/processor 475 are used to transmit a first signaling in a first time-frequency resource set.

In one embodiment, at least first four of the antenna 452, the receiver 454, the multi-antenna receiving processor 458, the receiving processor 456 and the controller/processor 459 are used to receive a first signal in a second time-frequency resource set; at least first four of the antenna 420, the transmitter 418, the multi-antenna transmitting processor 471, the transmitting processor 416 and the controller/processor 475 are used to transmit a first signal in a second time-frequency resource set.

In one embodiment, at least first four of the antenna 452, the receiver 454, the multi-antenna receiving processor 458, the receiving processor 456 and the controller/processor 459 are used to receive a third information block; at least first four of the antenna 420, the transmitter 418, the multi-antenna transmitting processor 471, the transmitting processor 416 and the controller/processor 475 are used to transmit a third information block.

In one embodiment, at least first four of the antenna 452, the receiver 454, the multi-antenna receiving processor 458, the receiving processor 456 and the controller/processor 459 are used to receive a fourth information block; at least first four of the antenna 420, the transmitter 418, the multi-antenna transmitting processor 471, the transmitting processor 416 and the controller/processor 475 are used to transmit a fourth information block.

Embodiment 5A

Figure 5A:
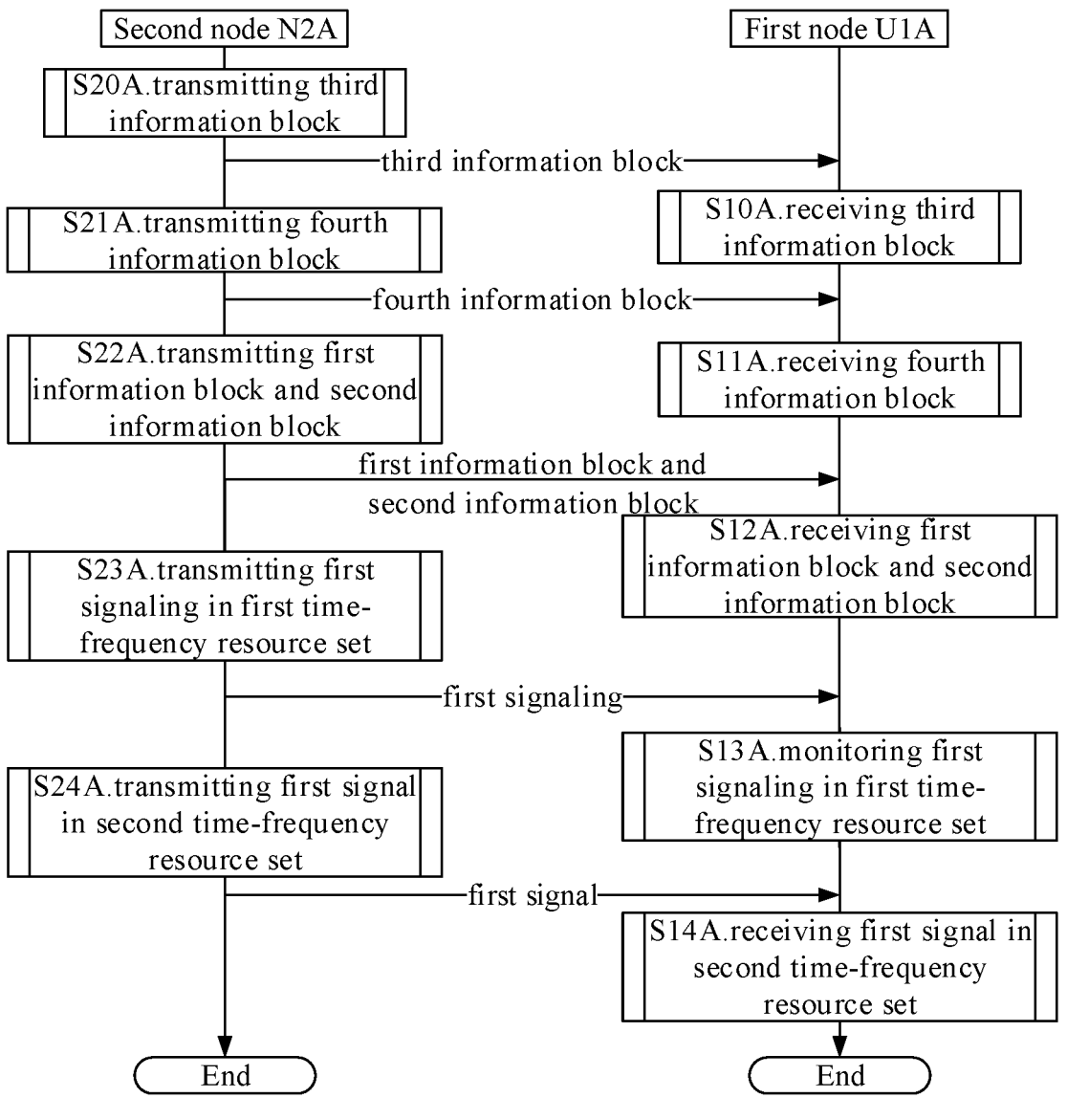
FIG. 5A illustrates a flowchart of a first signaling according to one embodiment of the present application.

Embodiment 5A illustrates a flowchart of a first signaling, as shown in FIG. 5A. In FIG. 5A, a first node U1A and a second node N2A are in communications via a radio link. It is particularly underlined that the order illustrated in the embodiment does not put constraints over sequences of signal transmissions and implementations.

The first node U1A receives a third information block in step S10A; receives a fourth information block in step S11A; receives a first information block and a second information block in step S12A; in step 13A, monitors a first signaling in a first time-frequency resource set; in step 14A, receives a first signal in a second time-frequency resource set.

The second node N2A transmits a third information block in step S20A; transmits a fourth information block in step S21A; transmits a first information block and a second information block in step S22A; transmits a first signaling in a first time-frequency resource set in step S23A; in step 24A, transmits a first signal in a second time-frequency resource set.

In embodiment 5A, the first information block indicates target reference signal resources; a demodulation reference signal of a channel occupied by the first signaling and the target reference signal resources are QCL, the first signaling comprises a first field, the first field in the first signaling indicates a first reference signal resource from a first reference signal resource set, and a demodulation reference signal of a channel occupied by the first signal and the first reference signal resource are QCL; the second information block indicates L candidate reference signal resource sets, L being a positive integer greater than 1, and the first reference signal resource set is one of the L candidate reference signal resource sets; the target reference signal resource is associated with one of L identities, the L identities are respectively associated with the L candidate reference signal resource sets, the first reference signal resource set is a candidate reference signal resource set associated with a first identity among the L candidate reference signal resource sets, and the first identity is an identity associated with the target reference signal resource among the L identities; the third information block is used to indicate M1 first-type reference signal resources, M1 being a positive integer greater than 1, the target reference signal resource is one of the M1 first-type reference signal resources, and the first information block is used to indicate the target reference signal resource from the M1 first-type reference signal resources; the fourth information block is used to indicate L second-type reference signal resource pools, the L candidate reference signal resource sets respectively correspond to the L second-type reference signal resource pools, and the second information block is used to indicate the L candidate reference signal resource sets from the L second-type reference signal resource pools.

In one embodiment, a demodulation reference signal of a channel occupied by the first signaling and the target reference signal resource have a first QCL relation, and a DMRS of a channel occupied by the first signal and the first reference signal resource have a second QCL relation; the first information block comprises a first TCI state, and the first TCI state indicates the target reference signal resource and the first QCL relation; the second information block comprises L TCI state sets, the L TCI state sets respectively correspond to the L candidate reference signal resource sets, any of the L TCI state sets comprises at least one TCI state, and a TCI state in any of the L TCI state sets indicates a candidate reference signal in a corresponding candidate reference signal resource set and a QCL relation; the second QCL relation and the first reference signal resource are indicated by a same TCI state.

In one embodiment, any candidate reference signal resource in the L candidate reference signal resource sets comprises one of an SSB or a CSI-RS resource.

In one embodiment, any candidate reference signal resource in the L candidate reference signal resource sets comprises one of an SSB, a CSI-RS resource, a Tracking Reference Signal (TRS), or a DMRS.

In one embodiment, any candidate reference signal resource in the L candidate reference signal resource sets comprises a downlink reference signal.

In one embodiment, the L identities respectively indicate L cells; when an identity is used to generate a signal in a reference signal resource, the reference signal resource is associated with the identity; or, when a reference signal resource and an SSB of a cell are QCL, the reference signal resource is associated with an identity indicating the cell.

In one embodiment, the cell in the present application is a serving cell.

In one embodiment, the cell in the present application corresponds to a PCI.

In one embodiment, the L identities respectively indicate L cells, radio resources occupied by a reference signal resource are indicated by a configuration signaling, an RLC bearer associated with the configuration signaling is configured through a CellGroupConfig IE, and when an Spcell configured by the CellGroupConfig IE comprises a cell, the reference signal is associated with an identity indicating the cell.

In one subembodiment of the embodiment, the configuration signaling comprises an RRC signaling.

In one subembodiment of the embodiment, the radio resources comprise time-frequency resources.

In one subembodiment of the embodiment, the radio resource comprises a Reference Signal (RS) sequence.

In one subembodiment of the embodiment, the radio resources comprise code-domain resources.

In one subembodiment of the embodiment, the L cells comprises a Primary Cell (Pcell) and a Primary SCG Cell (PScell) of the first node.

In one embodiment, the first information block comprises a second field, the second field is used to indicate an identity associated with the target reference signal resource among the L identities, and a number of bit(s) occupied by the second field is greater than 5.

In one subembodiment of the above embodiment, the second field occupies 16 bits.

In one subembodiment of the embodiment, the second field is used to indicate a PCI.

In one embodiment, M1 is equal to 8.

In one embodiment, M1 is equal to 1.

In one embodiment, the M1 first-type reference signal resources respectively correspond to M1 TCI states.

In one embodiment, there at least exists one of the M1 first-type reference signal resources comprising at least one of a CSI-RS resource or an SSB.

In one embodiment, there at least exists one of the M1 first-type reference signal resources corresponding to at least one of a CSI-RS or an SSB.

In one embodiment, there at least exists one of the M1 first-type reference signal resources corresponding to at least one of a CSI-RS resource identity or an SSB index.

In one embodiment, there at least exists one of the M1 first-type reference signal resources corresponding to a CSI-RS resource set identity.

In one embodiment, the third information block is used to indicate M1 first-type identities, the M1 first-type identities respectively correspond to the M1 first-type reference signals, and any of the M1 first-type identities is one of the L identities.

In one subembodiment of the embodiment, there at least exist two of the M1 first-type identities being different.

In one subembodiment of the embodiment, the first node determines an identity associated with the target reference signal resource among the L identities according to a first-type identity associated with the target reference signal resource.

In one embodiment, the third information block comprises a ControlResourceSet IE in TS 38. 331.

In one embodiment, the third information block comprises a SearchSpace IE in TS 38. 331.

In one embodiment, the third information block comprises a BeamFailureRecoveryConfig IE in TS 38. 331.

In one embodiment, a name of an RRC signaling bearing the third information block comprises a CORESET.

In one embodiment, a name of an RRC signaling bearing the third information block comprises SearchSpace.

In one embodiment, a name of an RRC signaling bearing the third information block comprises Recovery.

In one embodiment, a name of an RRC signaling bearing the third information block comprises Inter-cell.

In one embodiment, a name of an RRC signaling bearing the third information block comprises Mobility.

In one embodiment, the third information block is used to indicate a position of frequency-domain resources occupied by the first time-frequency resource set.

In one embodiment, the third information block is used to indicate a position of time-domain resources occupied by the first time-frequency resource set.

In one embodiment, the second information comprises L target fields; the L target fields are respectively used to indicate the L candidate reference signal resource sets, and the L identities associated with the L candidate reference signal resource sets.

In one subembodiment of the embodiment, a given target field is any target field in the L target fields, the given target field is used to indicate a given candidate reference signal resource set in the L candidate reference signal resource sets, and the given target field is used to indicate a given identity in the L identities; the given identity is associated with the given candidate reference signal resource set.

In one subsidiary embodiment of the subembodiment, the given target field comprises a first sub-field, and the first sub-field is used to indicate a CORESET pool to which the first time-frequency resource set belongs.

In one subsidiary embodiment of the subembodiment, the given target field comprises a second sub-field, and the second sub-field is used to indicate the given identity.

In one subsidiary embodiment of the subembodiment, the given target field comprises a third sub-field, and the third sub-field is used to indicate a DL BWP targeted by a BWP indicator in the first signaling using the second information block.

In one subsidiary embodiment of the subembodiment, the given target field comprises a fourth sub-field, and the fourth sub-field is used to indicate the given candidate reference signal resource set.

In one subsidiary embodiment of the above subembodiment, a number of bit(s) occupied by the fourth sub-field is not greater than 128.

In one subsidiary embodiment of the above subembodiment, the first sub-field, the second sub-field, the third sub-field and the fourth sub-field are continuous in the second information block.

In one subsidiary embodiment of the above subembodiment, the first sub-field, the second sub-field, the third sub-field and the fourth sub-field are discrete in the second information block.

In one subembodiment of the embodiment, the L target fields are continuous in the second information block.

In one subembodiment of the embodiment, the L target fields are discrete in the second information block.

In one embodiment, any of the L second-type reference signal resource pools comprises M2 second-type reference signal resources, M2 being a positive integer greater than 1.

In one subembodiment of the above embodiment, M2 is not greater than 128.

In one subembodiment of the above embodiment, M2 is greater than 8.

In one subembodiment of the embodiment, M2 is greater than K2 in the present application.

In one embodiment, the M2 second-type reference signal resources respectively correspond to M2 TCI states.

In one embodiment, there at least exists one of the M2 second-type reference signal resources comprising at least one of a CSI-RS resource or an SSB.

In one embodiment, there at least exists one of the M2 second-type reference signal resources corresponding to at least one of a CSI-RS or an SSB.

In one embodiment, there at least exists one of the M2 second-type reference signal resources corresponding to at least one of a CSI-RS resource identity or an SSB index.

In one embodiment, there at least exists one of the M2 second-type reference signal resources corresponding to a CSI-RS resource set identity.

In one embodiment, a given candidate reference signal resource set is any of the L candidate reference signal resource sets, and the given candidate reference signal resource set corresponds to a given second-type reference signal resource pool in the L second-type reference signal resource pools.

In one subembodiment of the embodiment, the given candidate reference signal resource set is a subset of the given second-type reference signal resource pool.

In one subembodiment of the embodiment, the given candidate reference signal resource set comprises K2 candidate reference signal resources, the given second-type reference signal resource pool comprises M2 second-type reference signal resources, and any of the K2 candidate reference signal resources is one of the M2 second-type reference signal resources.

Embodiment 5B

Figures 5B, 6A:
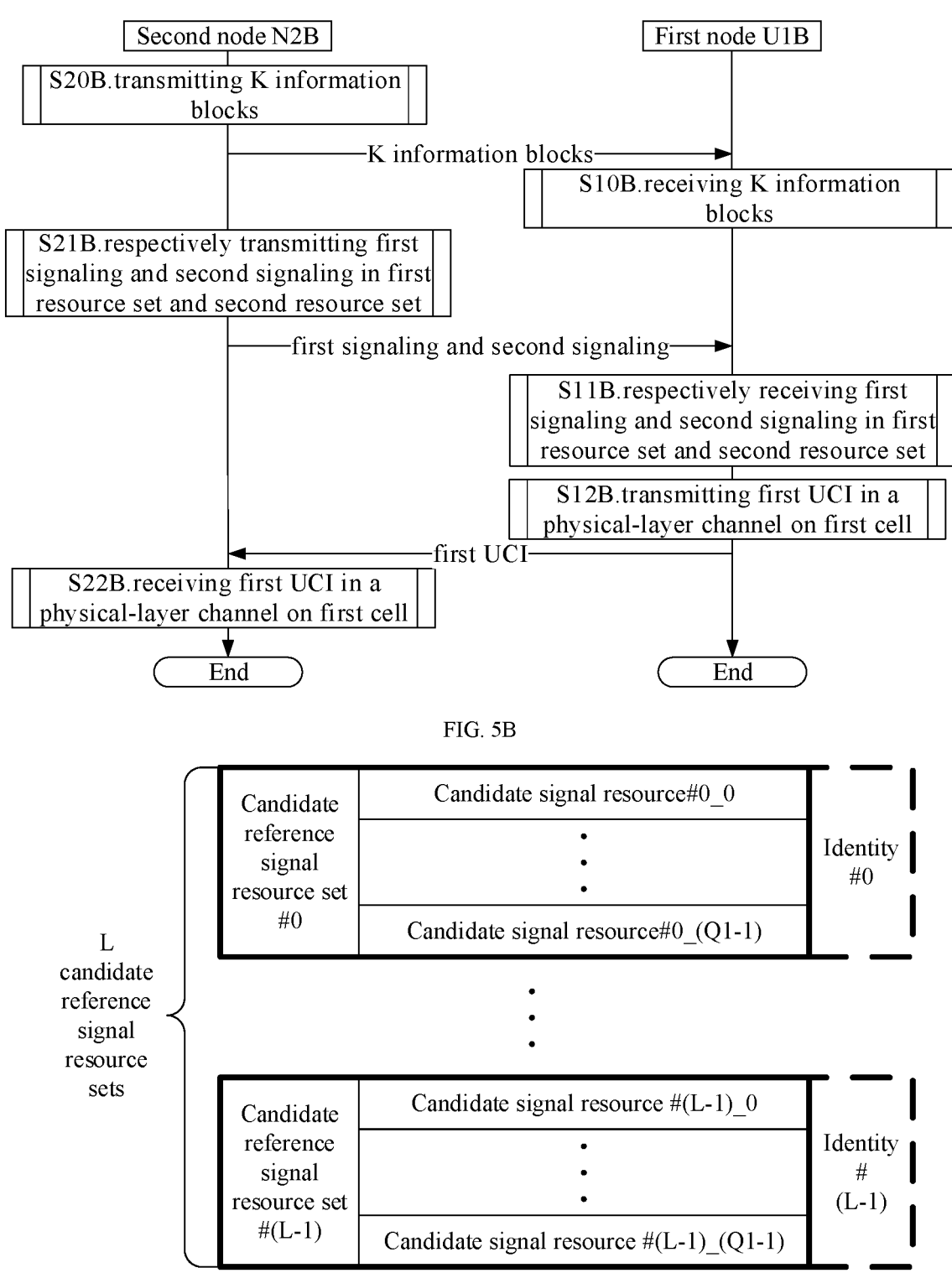
FIG. 5B illustrates a flowchart of first UCI according to one embodiment of the present application.
FIG. 6A illustrates a schematic diagram of L candidate reference signal resource sets according to one embodiment of the present application.

Embodiment 5B illustrates a flowchart of a first UCI, as shown in FIG. 5B. In FIG. 5B, a first node U1B and a second node N2B are in communications via a radio link. It is particularly underlined that the order illustrated in the embodiment does not put constraints over sequences of signal transmissions and implementations.

The first node U1B receives K information blocks in step S10B; respectively receives a first signaling and a second signaling in a first resource set and a second resource set in step S11B; transmits a first UCI in a physical-layer channel on a first cell in step S12B.

The second node N2B transmits K information blocks in step S20B; respectively transmits a first signaling and a second signaling in a first resource set and a second resource set in step S21B; receives a first UCI in a physical-layer channel on a first cell in step S22B.

In embodiment 5B, K is a positive integer greater than 1, each of the K information blocks comprises a first-type identity and at least one second-type identity, and each of the K information blocks is used to indicate a resource set; the first resource set is the resource set indicated by a first information block, the first information block is one of the K information blocks, the second resource set is the resource set indicated by a second information block, and the second information block is an information block other than the first information block among the K information blocks; the first cell is capable of bearing a HARQ-ACK associated with the first signaling; name of the first-type identity comprises CORESETPoolIndex; any second-type identity comprised in the K information blocks indicates a reference signal resource; a demodulation reference signal of a channel occupied by the first signaling and a first reference signal resource are QCL, and the second-type identity comprised in the first information block indicates the reference signal resource; a demodulation reference signal of a channel occupied by the second signaling and a second reference signal resource are QCL, and the second-type identity comprised in the second information block indicates the second reference signal resource; the first reference signal resource is associated with a target cell, and the second reference signal resource is associated with a first candidate cell; the first UCI comprises a HARQ-ACK associated with a second signaling, and the first-type identity indicated by the first information block and the target cell are used together to determine whether the first UCI comprises a HARQ-ACK associated with the first signaling.

In one embodiment, time-domain resources occupied by the first UCI are reference time-domain resources associated with a HARQ-ACK of the second signaling.

In one subembodiment of the embodiment, the first UCI comprises HARQ-ACKs associated with Q3 downlink signalings, Q3 being a positive integer greater than 1 and not greater than 14, and the second signaling is one of the Q3 downlink signalings; reference time-domain resources of HARQ-ACKs associated with the Q3 downlink signalings respectively occupy Q3 time slices, and the Q3 time slices belong to a same slot; the reference time-domain resources of HARQ-ACKs associated with the second signaling are a latest one of the Q3 time slices.

In one subsidiary of the embodiment, any of the Q3 time slices comprises at least one OFDM symbol.

In one subsidiary embodiment of the subembodiment, the Q3 time slices are respectively Q3 sub-slots.

In one subsidiary embodiment of the subembodiment, the Q3 time slices belong to a same slot.

In one subembodiment of the above embodiment, the first signaling is used to indicate the reference time-domain resources of a HARQ-ACK associate with the second signaling.

In one subembodiment of the above embodiment, an RRC signaling is used to indicate the reference time-domain resources of a HARQ-ACK associate with the second signaling.

In one subembodiment of the above embodiment, time-domain resources occupied by the second radio signal are used to determine the reference time-domain resources of a HARQ-ACK of the second signaling.

In one embodiment, both the first candidate cell and the first cell belong to an MCG.

In one embodiment, both the first candidate cell and the first cell are a same cell.

In one embodiment, the first-type identity comprised in the first information block is the same as the first-type identity comprised in the second information block; all conditions in a first condition set being satisfied is used to determine that the first UCI does not comprise a HARQ-ACK associated with the first signaling, and the first condition set comprises: the first candidate cell is different from the target cell.

In one subembodiment of the above embodiment, the first condition set comprises: the first candidate cell and the target cell belong to different cell groups.

In one subembodiment of the above embodiment, the meaning that the first candidate cell is different from the target cell comprises that the first candidate cell and the target cell respectively adopt different PCIs.

In one subembodiment of the above embodiment, the meaning that the first candidate cell is different from the target cell comprises that the first candidate cell and the target cell respectively adopt different ServCellIndexes.

In one subembodiment of the above embodiment, the first condition set comprises: there does not exist two second-type identities respectively comprised in two of the K information blocks indicating a same reference signal resource associated with the target cell, and the first-type identities comprised in the two information blocks are different.

In one subsidiary embodiment of the subembodiment, a given information block and a given second information block are any two information blocks comprising different first-type identities among the K information blocks, the given first information block comprises Q3 second-type identity(identities), the given second information block comprises Q4 second-type identity(identities), Q3 and Q4 being positive integers, and there does not exist two second-type identities respectively belonging to the given first information block and the given second information block being associated with a same reference signal resource of the target cell in the Q3 second-type identity(identities) and the Q4 second-type identity(identities).

In one embodiment, the first-type identity comprised in the first information block is the same as the first-type identity comprised in the second information block; all conditions in a first condition set being satisfied is used to determine that the first UCI does not comprise a HARQ-ACK associated with the first signaling, and the first condition set comprises that the first candidate cell is different from the target cell; HARQ-ACK(s) associated with all downlink physical-layer signalings of the target cell is(are) not fed back.

In one subembodiment of the embodiment, the target cell is only configured with a CORESET Pool.

In one subembodiment of the embodiment, the target cell is not configured with a CORESET Pool.

In one subembodiment of the embodiment, the meaning of the above phrase that HARQ-ACK associated with all downlink physical-layer signalings of the target cell is not respectively fed back comprises: HARQ-ACK(s) associated with all downlink physical-layer signalings of the target cell can be fed back in a HARQ codebook.

In one subsidiary embodiment of the subembodiment, the reference time-domain resources of all HARQ-ACKs belong to a slot.

In one subsidiary embodiment of the subembodiment, the reference time-domain resources of all HARQ-ACKs belong to a sub-slot.

In one embodiment, an offset between a reception of the first signaling and the first radio signal is less than a first offset value; a demodulation reference signal comprised in the first radio signal and a demodulation reference signal comprised in a CORESET with a minimum CORESET identity in a first target CORESET pool are QCL; the first target CORESET pool comprises a CORESET indicated by any information block in a first information block subset; the first information block subset comprises a first target information block, and the first target information block is any information block in all information blocks satisfying a first target condition set among the K information blocks; the first target condition set comprises that a first-type identity comprised in the first target information block is the same as the first-type identity comprised in the first information block; and the first target condition set comprises that the first target information block comprises at least one second-type identity, and reference signal resources indicated by the second-type identity comprised in the first target information block are associated with the target cell.

In one subembodiment of the above embodiment, the first target condition set also comprises: reference signal resources activated for a PDCCH reception are associated with the target cell, and the reference signal resources activated for the PDCCH reception are indicated by the second-type identity comprised in the first target information block.

In one subembodiment of the embodiment, a CORESET-PoolIndex adopted by the first target CORESET pool is equal to 0.

In one subembodiment of the embodiment, the first target CORESET pool is not configured with CORESETPoolIndex.

In one subembodiment of the embodiment, all CORE-SETs configured by the target cell belong to the first target CORESET pool.

In one subembodiment of the embodiment, the first condition set comprises the first target condition set.

In one embodiment, the first-type identity comprised in the first information block is different from the first-type identity comprised in the second information block; all conditions in a second condition set being satisfied is used to determine that the first UCI comprises a HARQ-ACK associated with the first signaling, and the second condition set comprises: the first candidate cell is the same as the target cell.

In one subembodiment of the above embodiment, the second condition set comprises: the first candidate cell and the first cell belong to different cell groups.

In one subembodiment of the above embodiment, the second condition set comprises: the first candidate cell and the first cell respectively belong to an SCG and an MCG.

In one subembodiment of the above embodiment, the second condition set comprises: there exist two second-type identities respectively comprised in two of the K information blocks indicating a same reference signal resource associated with the target cell, and the first-type identities comprised in the two information blocks are different.

In one subsidiary embodiment of the embodiment, a target first information block and a target second information block are any two information blocks comprising different first-type identities among the K information blocks, the target first information block comprises Q5 second-type identity (identities), the target second information block comprises Q6 second-type identity(identities), Q5 and Q6 being positive integers, there respectively existing two second-type identities in the Q5 second-type identity(identities) and the Q6 second-type identity(identities), and the two second-type identities are associated with a same reference signal resource in the target cell.

In one embodiment, an offset between a reception of the first signaling and the first radio signal is less than a first offset value; a demodulation reference signal comprised in the first radio signal and a demodulation reference signal comprised in a CORESET with a minimum CORESET identity in a second target CORESET pool are QCL;

the second target CORESET pool comprises a CORESET indicated by any information block in a second information block subset; the second information block subset comprises a second target information block, and the second target information block is any information block in all information blocks satisfying a second target condition set among the K information blocks; the second target condition set comprises that the second target information block comprises at least one second-type identity, and reference signal resources indicated by the second-type identity comprised in the second target information block are associated with the target cell.

In one subembodiment of the above embodiment, the second target condition set also comprises: reference signal resources activated for a PDCCH reception are associated with the target cell, and the reference signal resources activated for the PDCCH reception are indicated by the second-type identity comprised in the second target information block.

In one subembodiment of the embodiment, a CORESET-PoolIndex adopted by the second target CORESET pool is equal to 0.

In one subembodiment of the embodiment, the second target CORESET pool is not configured with a CORESET-PoolIndex.

In one subembodiment of the embodiment, all CORESETs configured by the target cell belong to the second target CORESET pool.

In one subembodiment of the embodiment, the second condition set comprises the second target condition set.

Embodiment 6A

Embodiment 6A illustrates a schematic diagram of L candidate reference signal resource sets, as shown in FIG. 6A. In FIG. 6A, L identities are respectively associated with the L candidate reference signal resource sets, the L candidate reference signal resource sets correspond to candidate reference signal resource set #0 to candidate reference signal resource set #(L−1) in the figure, and the L identities are respectively identity #0 to identity #(L−1); any of the L candidate reference signal resource sets comprises more than one reference signal resource.

In one embodiment, any of the L candidate reference signal resource sets comprises Q1 reference signal resources, Q1 being a positive integer greater than 1.

In one subembodiment of the above embodiment, Q1 is equal to 8.

In one subembodiment of the above embodiment, the Q1 reference signal resources respectively correspond to Q1 TCI-States.

In one subembodiment of the above embodiment, there at least exists one of the Q1 reference signal resources being associated with an SSB.

In one subembodiment of the above embodiment, there at least exists one of the Q1 reference signal resources being a CSI-RS resource.

In one embodiment, the L identities are L PCIs.

In one embodiment, any two of the L identities are different.

Embodiment 6B

Figures 6B, 7A, 7B, 8A:
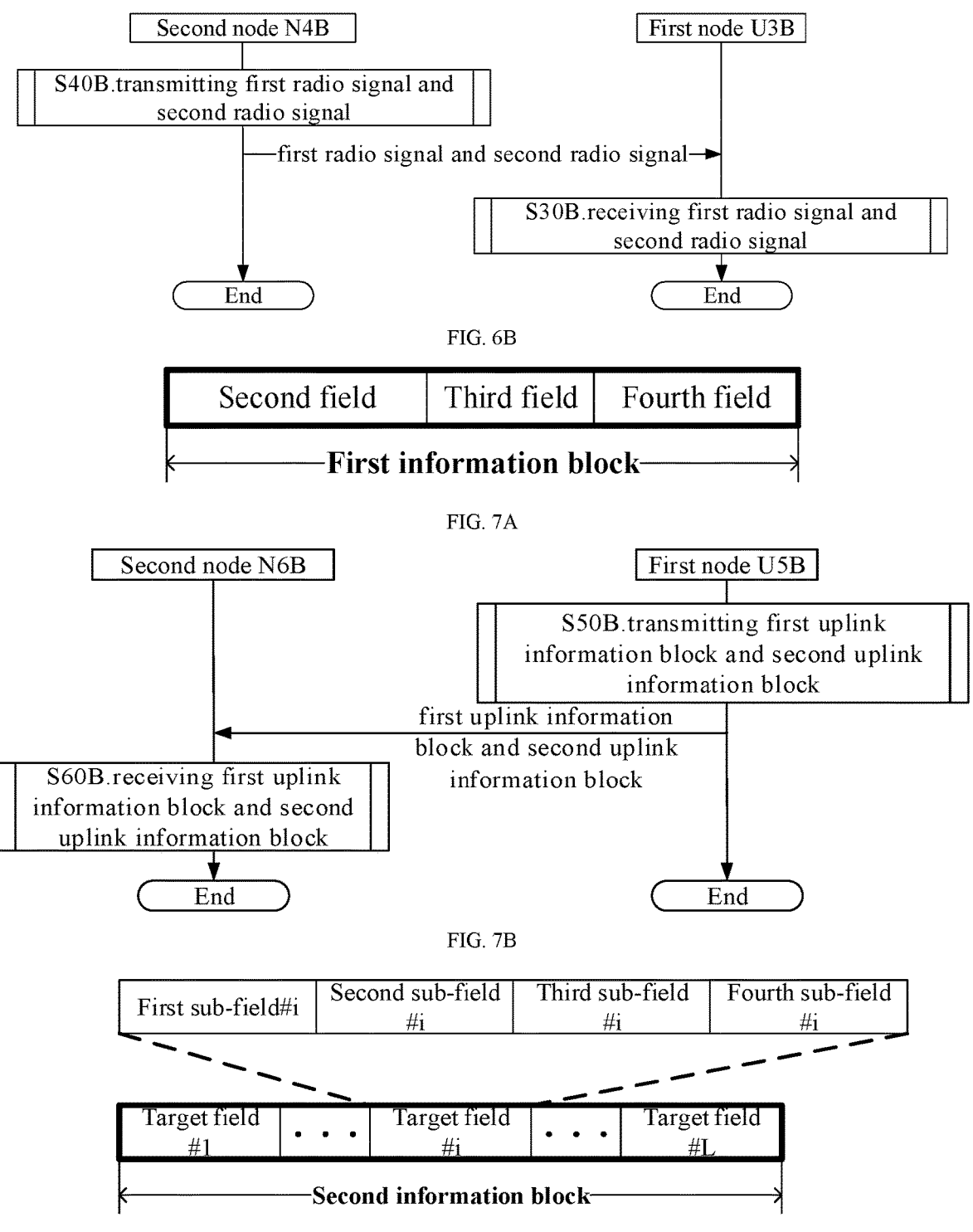
FIG. 6B illustrates a flowchart of a first radio signal and a second radio signal according to one embodiment of the present application.
FIG. 7A illustrates a schematic diagram of a first information block according to one embodiment of the present application.
FIG. 7B illustrates a flowchart of a first uplink information block and a second uplink information block according to one embodiment of the present application.
FIG. 8A illustrates a schematic diagram of a second information block according to one embodiment of the present application.

Embodiment 6B illustrates a schematic diagram of a first radio signal and a second radio signal, as shown in FIG. 6B. In FIG. 6B, a first node U3B and a second node N4B are in communications via a radio link. It is particularly underlined that the order illustrated in the embodiment does not put constraints over sequences of signal transmissions and implementations.

The first node U3B receives a first radio signal and a second radio signal in step S30B.

The second node N4B transmits a first radio signal and a second radio signal in step S40B.

In embodiment 6B, the first signaling comprises configuration information of the first radio signal, the HARQ-ACK associated with the first signaling indicates whether a bit block carried by the first radio signal is correctly decoded; the second signaling comprises configuration information of the second radio signal, the HARQ-ACK associated with the second signaling indicates whether a bit block carried by the second radio signal is correctly decoded.

In one embodiment, the step S30B is taken after the step S11B and before the step S12B in embodiment 5.

In one embodiment, the step S40B is taken after the step S21B and before the step S22B in embodiment 5.

In one embodiment, the first radio signal is transmitted on a Physical Downlink Shared Channel (PDSCH).

In one embodiment, the first radio signal is a PDSCH.

In one embodiment, the bit block comprises at least one Transport Block (TB).

In one embodiment, the bit block comprises at least one Code Block Group (CBG).

In one embodiment, the first signaling is a downlink grant, and the first signaling is used to schedule the first radio signal.

In one embodiment, configuration information of the first radio signal comprises frequency-domain resources occupied by the first radio signal.

In one embodiment, configuration information of the first radio signal comprises time-domain resources occupied by the first radio signal.

In one embodiment, configuration information of the first radio signal comprises a HARQ process number adopted by the first radio signal.

In one embodiment, configuration information of the first radio signal comprises a Modulation and Coding Scheme (MCS) adopted by the first radio signal.

In one embodiment, configuration information of the first radio signal comprises a Redundancy Version (RV) adopted by the first radio signal.

In one embodiment, the second radio signal is transmitted on a PDSCH.

In one embodiment, the second radio signal is a PDSCH.

In one embodiment, the bit block comprises at least one TB.

In one embodiment, the bit block comprises at least one CBG.

In one embodiment, the second signaling is a downlink grant, and the second signaling is used to schedule the second radio signal.

In one embodiment, configuration information of the second radio signal comprises frequency-domain resources occupied by the second radio signal.

In one embodiment, configuration information of the second radio signal comprises time-domain resources occupied by the second radio signal.

In one embodiment, configuration information of the second radio signal comprises a HARQ-ACK process number adopted by the second radio signal.

In one embodiment, configuration information of the second radio signal comprises an MCS adopted by the second radio signal.

In one embodiment, configuration information of the second radio signal comprises an RV adopted by the second radio signal.

Embodiment 7A

Embodiment 7A illustrates a schematic diagram of a first information block, as shown in FIG. 7A. In FIG. 7A, the first information block comprises a second field, the second field is used to indicate an identity associated with the target reference signal resource among the L identities; the first information block also comprises a third field, and the third field is used to indicate an identity adopted by the first time-frequency resource set; the first information block also comprises a fourth field, and the fourth field is used to indicate the target reference signal resource.

In one embodiment, the second field comprises 16 bit.

In one embodiment, the second field indicates a PCI.

In one embodiment, the second field indicates a Cell-GroupId.

In one embodiment, the second field indicates a TRP identity.

In one embodiment, the third field comprises 4 bits.

In one embodiment, the third field indicates a CORESET ID.

In one embodiment, the fourth field comprises 7 bit.

In one embodiment, the fourth field indicates a TCI State ID.

In one embodiment, the fourth field indicates the target reference signal resource from the M1 first-type reference signal resources in the present application.

In one subembodiment of the above embodiment, M1 is equal to 128.

In one subembodiment of the above embodiment, M1 is not greater than 128.

Embodiment 7B

Embodiment 7B illustrates a flowchart of a first uplink information block and a second uplink information block, as shown in FIG. 7B. In FIG. 7B, a first node U5B and a second node N6B are in communications via a radio link. It is particularly underlined that the order illustrated in the embodiment does not put constraints over sequences of signal transmissions and implementations.

The first node U5B transmits a first uplink information block and a second uplink information block in step S50B.

The second node N6B receives a first uplink information and a second uplink information block in step S60B.

In embodiment 7B, the first uplink information block is used to indicate the second-type identity comprised in the first information block, and the second uplink information block is used to indicate the second-type identity comprised in the second information block.

In one embodiment, the step S50B is taken after the step S10B and before the step S11B in embodiment 5B.

In one embodiment, the step S60B is taken after the step S20B and before the step S21B in embodiment 5B.

In one embodiment, a physical-layer channel bearing the first uplink information block comprises a PUCCH.

In one embodiment, a physical-layer channel bearing the first uplink information block comprises a Physical Random Access Channel (PRACH).

In one embodiment, a Beam Failure Recovery (BFR) bears the first uplink information block.

In one embodiment, the first uplink information block is used for reporting beam failure.

In one embodiment, the first uplink information block is used for reporting a new candidate beam.

In one embodiment, the first uplink information block is used to indicate a given second-type identity, and the given second-type identity is used to indicate the first reference signal resource.

In one embodiment, a physical-layer channel bearing the second uplink information block comprises a PUCCH.

In one embodiment, a physical-layer channel bearing the second uplink information block comprises a PRACH.

In one embodiment, a BFR bears the second uplink information block.

In one embodiment, the second uplink information block is used for reporting beam failure.

In one embodiment, the second uplink information block is used for reporting a new candidate beam.

In one embodiment, the second uplink information block is used to indicate a given second-type identity, and the given second-type identity is used to indicate the first reference signal resource.

Embodiment 8A

Embodiment 8A illustrates a schematic diagram of a second information block, as shown in FIG. 8A. In FIG. 8A, the second information comprises L target fields; the L target fields are respectively used to indicate the L candidate reference signal resource sets, and the L identities associated with the L candidate reference signal resource sets. The target fields #1 to target field #L shown in FIG. 8A correspond to the L target fields; a target field #i shown in FIG. 8A is one of the L target fields, and the target field #i comprises a first sub-field #i, a second sub-field #i, a third sub-field #i and a fourth sub-field #i; the target field #i is used to indicate a candidate reference signal resource set #i among the L candidate reference signal resource sets, and an identity #i associated with the candidate reference signal resource set #i among the L identities.

In one embodiment, the first sub-field #i indicates a CORESET Pool ID of a CORESET Pool to which the first time-frequency resource set belongs in a cell corresponding to the identity #i.

In one embodiment, the first sub-field #i occupies 1 bit.

In one embodiment, the second sub-field #i indicates the identity #i.

In one embodiment, the second sub-field occupies 16 bits.

In one embodiment, the third sub-field #i indicates a Downlink (DL) Bandwidth Part (BWP) targeted by a BWP indicator in the first signaling using the second information block.

In one embodiment, the third sub-field #i occupies 2 bits.

In one embodiment, the fourth sub-field #i indicates the candidate reference signal resource set #i.

In one embodiment, a number of bit(s) occupied by the fourth sub-field #i is not greater than 128.

Embodiment 8B

Embodiment 8B illustrates a flowchart of a third information block and a fourth information block, as shown in FIG. 8B. In FIG. 8B, a first node U7B and a second node N8B are in communications via a radio link. It is particularly underlined that the order illustrated in the embodiment does not put constraints over sequences of signal transmissions and implementations.

The first node U7B receives a third information block and a fourth information block in step S70B.

The second node N8B transmits a third information block and a fourth information block in step S80B.

In embodiment 8B, the third information block is used to indicate the second-type identity comprised in the first information block, and the fourth information block is used to indicate the second-type identity comprised in the second information block.

In one embodiment, the step S70B is taken after the step S10B and before the step S11B in embodiment 5B.

In one embodiment, the step S80B is taken after the step S20B and before the step S21B in embodiment 5B.

In one embodiment, the third information block is beared through a MAC Control Element (MAC CE).

In one embodiment, the third information block is a TCI State Indication for UE-specific PDCCH MAC CE.

In one embodiment, the first information block comprises Q1 second-type identities, the third information block is used to indicate a given second-type identity from the Q1 second-type identities, and the given second-type identity is used to indicate the first reference signal resource.

In one embodiment, the fourth information block is beared through a MAC CE.

In one embodiment, the fourth information block is a TCI State Indication for UE-specific PDCCH MAC CE.

In one embodiment, the second information block comprises Q2 second-type identities, the fourth information block is used to indicate a target second-type identity from the Q2 second-type identities, and the target second-type identity is used to indicate the second reference signal resource.

Embodiment 9A

Embodiment 9A illustrates a schematic diagram of another second information block, as shown in FIG. 9A. In FIG. 9A, the second information block comprises a first target field, a second target field, a third target field, and a fourth target field.

In one embodiment, the first target field comprises L first target sub-fields, and the L first target resources are respectively used to indicate CORESET Pool IDs of CORESET Pools to which the first time-frequency resource set belongs in L cells corresponding to the L identities.

In one embodiment, the second target field comprises L second target sub-fields, and the L second target resources are respectively used to indicate the L identities.

In one embodiment, the third target field comprises L third target sub-fields, and the L third target resources are respectively used to indicate a DL BWP targeted by a BWP indicator in the first signaling adopting the second information block in L cells corresponding to the L identities.

In one embodiment, the fourth target field comprises L fourth target sub-fields, and the L fourth target resources are respectively used to indicate the L candidate reference signal resource sets.

In one embodiment, any of the L first target sub-fields occupies 1 bit.

In one embodiment, any of the L second target sub-fields occupies 16 bit.

In one embodiment, any of the L third target sub-fields occupies 2 bit.

In one embodiment, a number of bit(s) occupied by any of the L fourth target sub-fields is not greater than 128.

Embodiment 9B

Embodiment 9B illustrates a schematic diagram of K information blocks, as shown in FIG. 9B. In FIG. 9B, a given information block is one of K information blocks shown in the figure, and the given information block comprises a first-type identity and M1 second-type identities, M1 being a positive integer greater than 1. The K information blocks respectively correspond to information block #0 to information block #(K−1) shown in the figure.

In one embodiment, the given information block comprises a ControlResourceSet IE in TS 38. 331.

In one embodiment, the given information block is used to configure a CORESET.

In one embodiment, a CORESET indicated by the given information block is configured by the target cell and the first candidate cell at the same time.

In one embodiment, both the target cell and the first candidate cell can transmit a PDCCH in a CORESET indicated by the given information block.

In one embodiment, the given information block is any of the K information blocks.

In one embodiment, the given information block is the first information block, and a CORESET indicated by the given information block is the first resource set.

In one embodiment, the given information block is the second information block, and a CORESET indicated by the given information block is the second resource set.

In one embodiment, the first-type identity is used to indicate a CORESET Pool to which a CORESET configured by the given information block belongs.

In one embodiment, any of the M1 second-type identities is used to indicate a TCI-StateId.

Embodiment 10A

Embodiment 10A illustrates another schematic diagram of a second information block, as shown in FIG. 10A. In FIG. 10A, the second information block comprises a first target field and a second target field.

In one embodiment, the first target field is related to a position of time-frequency resources where the first time-frequency resource set is located.

In one embodiment, the second target field is used to indicate the L candidate reference signal resource sets.

In one embodiment, the first target field is used to indicate a CORESET Pool ID of a CORESET Pool where the first time-frequency resource set is located, and the first node assumes that CORESET Pool IDs of CORESET Pools where the first time-frequency resource set is located in L cells corresponding to the L identities are the same.

In one embodiment, the first target field is used to indicate a DL BWP targeted by a BWP Indicator in the first signaling adopting the second information block in L cells corresponding to the L identities, and the first node assumes that a BWP ID of the targeted DL BWP in L cells corresponding to L identities are the same.

In one embodiment, the second target field comprises L second target sub-fields, and the L second target sub-fields are respectively used to indicate the L candidate reference signal resource sets.

In one subembodiment of the embodiment, the L second target sub-fields sequentially indicate the L candidate reference signal resource sets, and the L candidate reference signal resource sets are associated with the L candidate reference signal resource sets according to an ascending order of size of the L identities.

In one subembodiment of the embodiment, the L second target sub-fields sequentially indicate the L candidate reference signal resource sets, and the L candidate reference signal resource sets are associated with the L candidate reference signal resource sets according to a descending order of size of the L identities.

In one subembodiment of the embodiment, the L second target sub-fields are continuous in the second information block.

In one subembodiment of the embodiment, the second information block does not comprise a bit used for explicitly indicating the L identities.

Embodiment 10B

Embodiment 10B illustrates a schematic diagram of a given resource set, as shown in FIG. 10B. In FIG. 10B, the given resource set occupies more than one RE, the given resource set is associated with a first-type identity, and the given resource set is associated with M2 second-type identities, M2 being a positive integer greater than 1.

In one embodiment, the given resource set is a first resource set in the present application.

In one embodiment, the given resource set is a second resource set in the pre sent application.

In one embodiment, the given resource set is configured by one of the K information blocks in the present application.

In one embodiment, the M2 second-type identities are used to indicate M2 reference signal resources.

In one subembodiment of the embodiment, a PDCCH transmitted in the given resource set is at least QCL with one of the M2 reference signal resources.

In one subembodiment of the embodiment, any of the M2 reference signal resources can be configured to be QCL with a PDCCH transmitted in the given resource set.

In one embodiment, an information block configuring the given resource set is transmitted by one of the target cell or the first candidate cell to the first node.

In one embodiment, the target cell and the first candidate cell can transmit a PDCCH of the first node in the given resource set.

Embodiment 11A

Figures 11A, 11B, 12A, 12B:
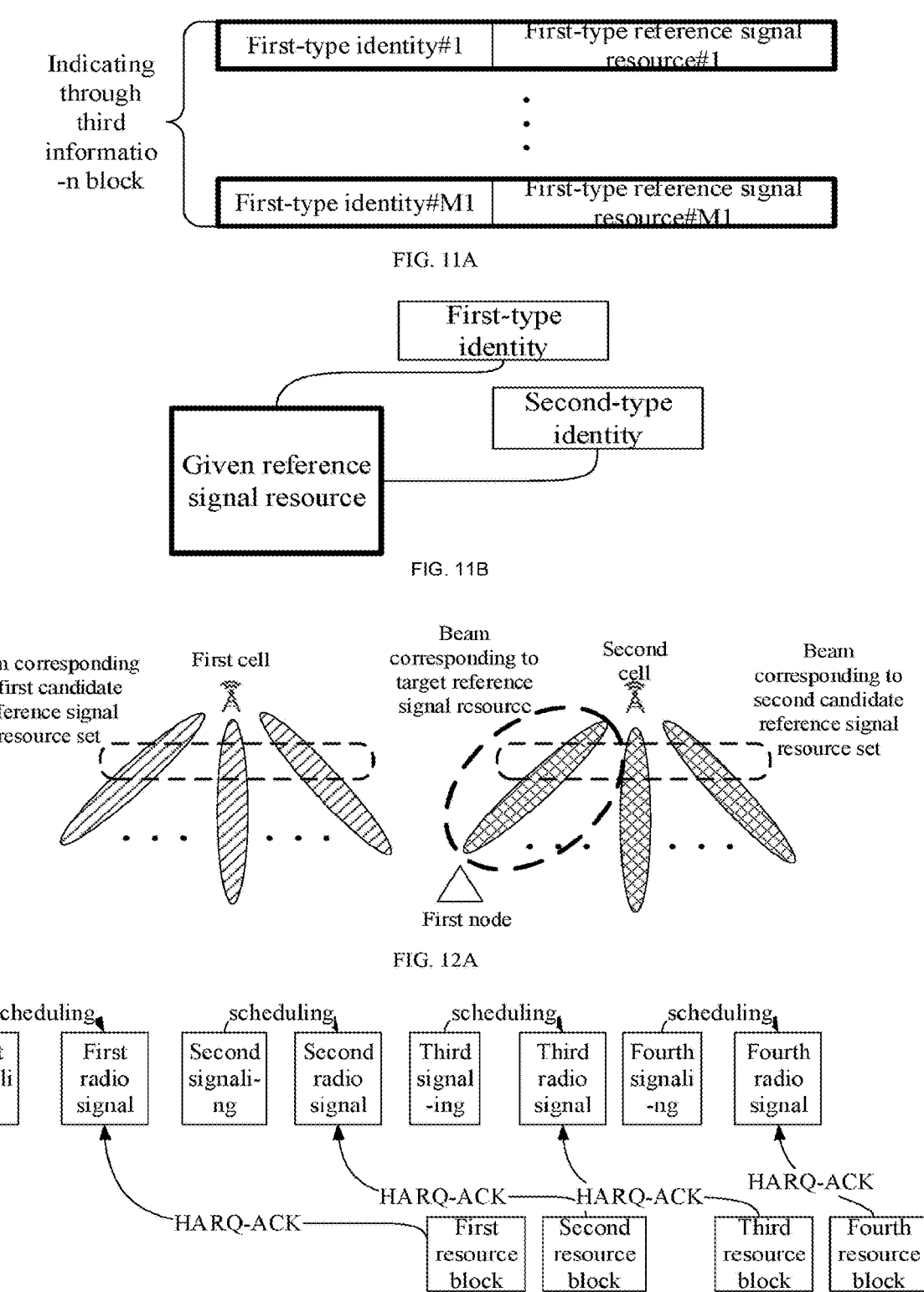
FIG. 11A illustrates a schematic diagram of a third information block according to one embodiment of the present application.
FIG. 11B illustrates a schematic diagram of given reference signal resources according to one embodiment of the present application.
FIG. 12A illustrates a schematic diagram of an application scenario according to one embodiment of the present application.
FIG. 12B illustrates a schematic diagram of first UCI according to one embodiment of the present application.

Embodiment 11A illustrates a schematic diagram of a third information block, as shown in FIG. 11A. In FIG. 11A, the third information block is used to indicate M1 first-type reference signal resources, and the first information block is used to indicate the target reference signal resource from the M1 first-type reference signal resources. First-type reference signal resource #1 to First-type reference signal resource #M1 shown in FIG. 11A are respectively the M1 first-type reference signal resources; the M1 first-type identities indicated by the third information block respectively correspond to the M1 first-type reference signals, and any of the M1 first-type identities is one of the L identities. First-type identity #1 to first-type identity #M1 in FIG. 11 respectively correspond to the M1 first-type identities.

Embodiment 11B

Embodiment 11B illustrates a schematic diagram of a given reference signal resource, as shown in FIG. 11B. In FIG. 11B, a given reference signal resource is associated with a second-type identity in the present application, and the given reference signal resource is associated with a given cell.

In one embodiment, the given reference signal resource is used to transmit a CSI-RS.

In one embodiment, the given reference signal resource is used to transmit an SSB.

In one embodiment, the given reference signal resource is the first reference signal resource, and the given cell is the target cell.

In one embodiment, the given reference signal resource is the second reference signal resource, and the given cell is the first candidate cell.

Embodiment 12A

Embodiment 12A illustrates a schematic diagram of an application scenario, as shown in FIG. 12A. In FIG. 12A, L in the present application is equal to 2, the L identities is a first identity and a second identity, the first identity corresponds to a first cell in the figure, and the second identity corresponds to a second cell in the figure; the L candidate reference signal resource sets are respectively a first candidate reference signal resource set and a second candidate reference signal resource set, the first candidate reference signal resource set is associated with the first cell, and the second candidate reference signal resource set is associated with the second cell; in the figure, the first node moves from a first cell to a second cell and receives a PDCCH using a target reference signal resource; when the target reference signal resource is associated with the second cell, the second candidate reference signal resource set is the first reference signal resource set in the present application, and the first signaling in the present application is used to indicate the first reference signal resource from the second candidate reference signal resource set.

The slash-filled ellipse in the figure corresponds to a beam corresponding to the first candidate reference signal resource set, and the cross-line filled ellipse in the figure corresponds to a beam corresponding to the second candidate reference signal resource set; the dotted ellipse in the figure corresponds to a beam corresponding to the target reference signal resource.

In one embodiment, the first cell maintains the L candidate reference signal resource sets.

In one embodiment, the first cell maintains the M1 first-type reference signal resources in the present application.

In one embodiment, the first cell maintains the L second-type reference signal resource pools in the present application.

In one embodiment, the second cell transmits the first signaling.

In one embodiment, the second cell transmits the first signal.

In one embodiment, the second cell transmits the first information block.

In one embodiment, the second cell transmits the second information block.

In one embodiment, the first cell transmits the first information block.

In one embodiment, the first cell transmits the second information block.

In one embodiment, the first cell transmits the third information block.

In one embodiment, the first cell transmits the fourth information block.

Embodiment 12B

Embodiment 12B illustrates a schematic diagram of a first UCI, as shown in FIG. 12B. In FIG. 12B, the first UCI in the present application does not comprise a HARQ-ACK associated with a second signaling, a first signaling in the figure is used to schedule a first radio signal and a first resource block is used to feed back a HARQ-ACK for the first radio signal, and a second signaling in the figure is used to schedule a second radio signal and a second resource block is used to feed back a HARQ-ACK for the second radio signal; besides, a third signaling in the figure is used to schedule a third radio signal and a third resource block is used to feed back a HARQ-ACK for the third radio signal, and a fourth signaling in the figure is used to schedule a fourth radio signal and a fourth resource block is used to feed back a HARQ-ACK for the fourth radio signal; in the figure, a HARQ-ACK of the first radio signal and a HARQ-ACK of the third radio signal belong to a HARQ-ACK codebook, and both a HARQ-ACK of the first radio signal and a HARQ-ACK of the third radio signal are fed back in the third resource block; a HARQ-ACK of the second radio signal and a HARQ-ACK of the fourth radio signal belong to a HARQ-ACK codebook, and both a HARQ-ACK of the second radio signal and a HARQ-ACK of the fourth radio signal are fed back in the first UCI transmitted in the fourth resource block.

In one embodiment, the first resource block is not used to feed back a HARQ-ACK of the first radio signal.

In one embodiment, the second resource block is not used to feed back a HARQ-ACK of the second radio signal.

In one embodiment, the first resource block and the third resource block belong to a same slot.

In one embodiment, the second resource block and the fourth resource block belong to a same slot.

In one embodiment, the first resource block and the second resource block belong to a same slot.

In one embodiment, time-domain resources occupied by the first resource block and time-domain resources occupied by the third resource block are overlapping.

In one embodiment, time-domain resources occupied by the first resource block and time-domain resources occupied by the third resource block are orthogonal.

In one embodiment, time-domain resources occupied by the second resource block and time-domain resources occupied by the fourth resource block are overlapping.

In one embodiment, time-domain resources occupied by the second resource block and time-domain resources occupied by the fourth resource block are orthogonal.

In one embodiment, time-domain resources occupied by the fourth resource block are the reference time-domain resources of a HARQ-ACK associated with the second signaling.

Embodiment 13A

Figure 13A:
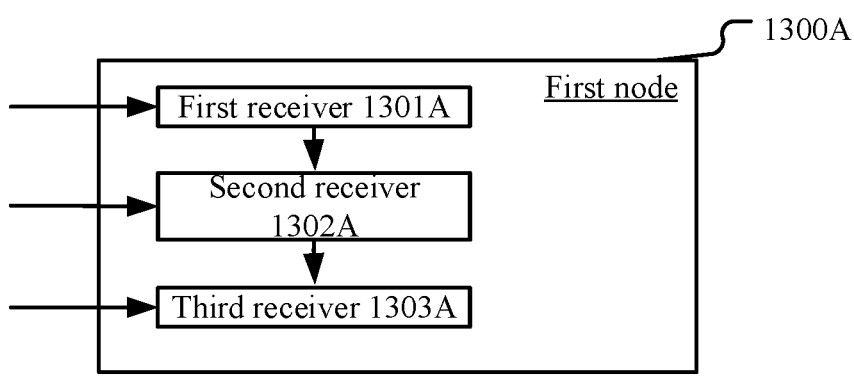
FIG. 13A illustrates a structure block diagram of a processor in a first node according to one embodiment of the present application.

Embodiment 13A illustrates a structure block diagram of a processor in a first communication node, as shown in FIG. 13A. In FIG. 13A, a first node 1300A comprises a first receiver 1301A, a second receiver 1302A and a third receiver 1303A.

The first receiver 1301A receives a first information block and a second information block;

the second receiver 1302A monitors a first signaling in a first time-frequency resource set; and the third receiver 1303A receives a first signal in a second time-frequency resource set;

In embodiment 13A, the first information block indicates target reference signal resources; a demodulation reference signal of a channel occupied by the first signaling and the target reference signal resources are QCL, the first signaling comprises a first field, the first field in the first signaling indicates a first reference signal resource from a first reference signal resource set, and a demodulation reference signal of a channel occupied by the first signal and the first reference signal resource are QCL; the second information block indicates L candidate reference signal resource sets, L being a positive integer greater than 1, and the first reference signal resource set is one of the L candidate reference signal resource sets; the target reference signal resource is associated with one of L identities, the L identities are respectively associated with the L candidate reference signal resource sets, the first reference signal resource set is a candidate reference signal resource set associated with a first identity among the L candidate reference signal resource sets, and the first identity is an identity associated with the target reference signal resource among the L identities.

In one embodiment, a demodulation reference signal of a channel occupied by the first signaling and the target reference signal resource have a first QCL relation, and a DMRS of a channel occupied by the first signal and the first reference signal resource have a second QCL relation; the first information block comprises a first TCI state, and the first TCI state indicates the target reference signal resource and the first QCL relation; the second information block comprises L TCI state sets, the L TCI state sets respectively correspond to the L candidate reference signal resource sets, any of the L TCI state sets comprises at least one TCI state, and a TCI state in any of the L TCI state sets indicates a candidate reference signal in a corresponding candidate reference signal resource set and a QCL relation; the second QCL relation and the first reference signal resource are indicated by a same TCI state.

In one embodiment, the L identities respectively indicate L cells; when an identity is used to generate a signal in a reference signal resource, the reference signal resource is associated with the identity; or, when a reference signal resource and an SSB of a cell are QCL, the reference signal resource is associated with an identity indicating the cell.

In one embodiment, the L identities respectively indicate L cells, radio resources occupied by a reference signal resource are indicated by a configuration signaling, an RLC bearer associated with the configuration signaling is configured through a CellGroupConfig IE, and when an Spcell configured by the CellGroupConfig IE comprises a cell, the reference signal is associated with an identity indicating the cell.

In one embodiment, the first information block comprises a second field, the second field is used to indicate an identity associated with the target reference signal resource among the L identities, and a number of bit(s) occupied by the second field is greater than 5.

In one embodiment, the first receiver 1301 receives a third information block; the third information block is used to indicate M1 first-type reference signal resources, M1 being a positive integer greater than 1, the target reference signal resource is one of the M1 first-type reference signal resources, and the first information block is used to indicate the target reference signal resource from the M1 first-type reference signal resources.

In one embodiment, the second information comprises L target fields; the L target fields are respectively used to indicate the L candidate reference signal resource sets, and the L identities associated with the L candidate reference signal resource sets.

In one embodiment, the first receiver 1301A receives a fourth information block; the fourth information block is used to indicate L second-type reference signal resource pools, the L candidate reference signal resource sets respectively correspond to the L second-type reference signal resource pools, and the second information block is used to indicate the L candidate reference signal resource sets from the L second-type reference signal resource pools.

In one embodiment, the first receiver 1301A comprises at least first four of the antenna 452, the receiver 454, the multi-antenna receiving processor 458, the receiving processor 456 and the controller/processor 459 in Embodiment 4.

In one embodiment, the second receiver 1302A comprises at least first four of the antenna 452, the receiver 454, the multi-antenna receiving processor 458, the receiving processor 456 and the controller/processor 459 in Embodiment 4.

In one embodiment, the third receiver 1303A comprises at least first four of the antenna 452, the receiver 454, the multi-antenna receiving processor 458, the receiving processor 456 and the controller/processor 459 in Embodiment 4.

Embodiment 13B

Figure 13B:
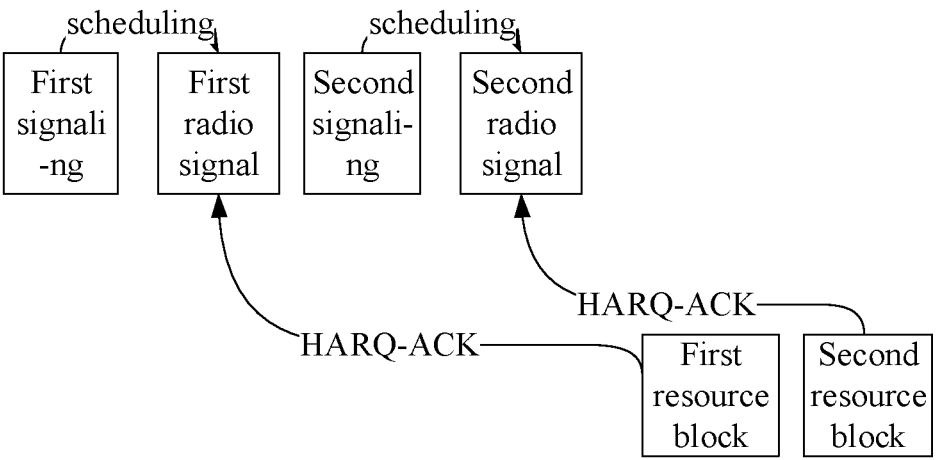
FIG. 13B illustrates a schematic diagram of first UCI according to another embodiment of the present application.

Embodiment 13B illustrates a schematic diagram of another first UCI, as shown in FIG. 13B. In FIG. 113B, the first UCI in the present application comprises a HARQ-ACK associated with a second signaling, a first signaling in the figure is used to schedule a first radio signal and a first resource block is used to feed back a HARQ-ACK for the first radio signal, and a second signaling in the figure is used to schedule a second radio signal and a second resource block is used to feed back a HARQ-ACK for the second radio signal; in the figure, a HARQ-ACK of the first radio signal and a HARQ-ACK of the second radio signal belong to a HARQ-ACK codebook, and both the HARQ-ACK of the first radio signal and the HARQ-ACK of the second radio signal are fed back in the second resource block.

In one embodiment, the first resource block is not used to feed back a HARQ-ACK of the first radio signal.

In one embodiment, the first resource block and the second resource block belong to a same slot.

In one embodiment, time-domain resources occupied by the first resource block and time-domain resources occupied by the second resource block are overlapping.

In one embodiment, time-domain resources occupied by the first resource block and time-domain resources occupied by the second resource block are orthogonal.

In one embodiment, time-domain resources occupied by the second resource block are the reference time-domain resources of a HARQ-ACK associated with the second signaling.

Embodiment 14A

Figure 14A:
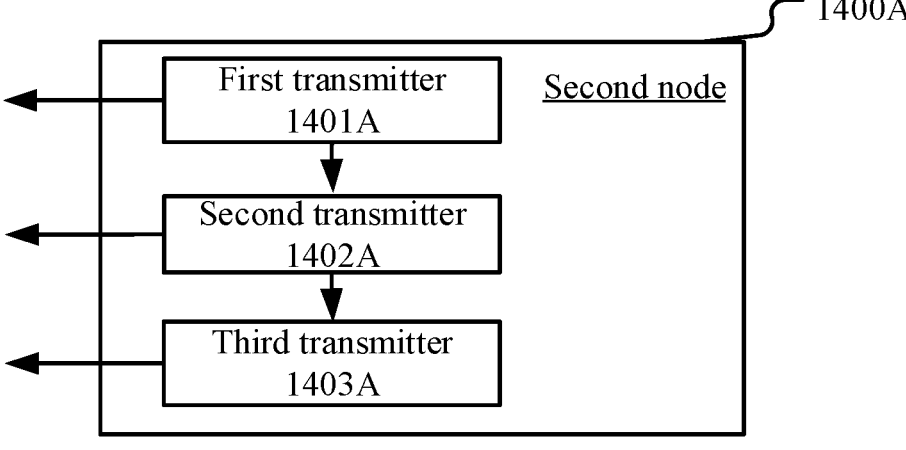
FIG. 14A illustrates a structure block diagram of a processor in second node according to one embodiment of the present application.

Embodiment 14A illustrates a structure block diagram of a processor in a second node, as shown in FIG. 14A. In FIG. 14A, a second node 1400A comprises a first transmitter 1401A, a second transmitter 1402A and a third transmitter 1403A.

The first transmitter 1401A transmits a first information block and a second information block;

the second transmitter 1402A transmits a first signaling in a first time-frequency resource set;

the third transmitter 1403A transmits a first signal in a second time-frequency resource set;

In embodiment 14A, the first information block indicates target reference signal resources; a demodulation reference signal of a channel occupied by the first signaling and the target reference signal resources are QCL, the first signaling comprises a first field, the first field in the first signaling indicates a first reference signal resource from a first reference signal resource set, and a demodulation reference signal of a channel occupied by the first signal and the first reference signal resource are QCL; the second information block indicates L candidate reference signal resource sets, L being a positive integer greater than 1, and the first reference signal resource set is one of the L candidate reference signal resource sets; the target reference signal resource is associated with one of L identities, the L identities are respectively associated with the L candidate reference signal resource sets, the first reference signal resource set is a candidate reference signal resource set associated with a first identity among the L candidate reference signal resource sets, and the first identity is an identity associated with the target reference signal resource among the L identities.

In one embodiment, a demodulation reference signal of a channel occupied by the first signaling and the target reference signal resource have a first QCL relation, and a DMRS of a channel occupied by the first signal and the first reference signal resource have a second QCL relation; the first information block comprises a first TCI state, and the first TCI state indicates the target reference signal resource and the first QCL relation; the second information block comprises L TCI state sets, the L TCI state sets respectively correspond to the L candidate reference signal resource sets, any of the L TCI state sets comprises at least one TCI state, and a TCI state in any of the L TCI state sets indicates a candidate reference signal in a corresponding candidate reference signal resource set and a QCL relation; the second QCL relation and the first reference signal resource are indicated by a same TCI state.

In one embodiment, the L identities respectively indicate L cells; when an identity is used to generate a signal in a reference signal resource, the reference signal resource is associated with the identity; or, when a reference signal resource and an SSB of a cell are QCL, the reference signal resource is associated with an identity indicating the cell.

In one embodiment, the L identities respectively indicate L cells, radio resources occupied by a reference signal resource are indicated by a configuration signaling, an RLC bearer associated with the configuration signaling is configured through a CellGroupConfig IE, and when an Spcell configured by the CellGroupConfig IE comprises a cell, the reference signal is associated with an identity indicating the cell.

In one embodiment, the first information block comprises a second field, the second field is used to indicate an identity associated with the target reference signal resource among the L identities, and a number of bit(s) occupied by the second field is greater than 5.

In one embodiment, the first transmitter 1401 transmits a third information block; the third information block is used to indicate M1 first-type reference signal resources, M1 being a positive integer greater than 1, the target reference signal resource is one of the M1 first-type reference signal resources, and the first information block is used to indicate the target reference signal resource from the M1 first-type reference signal resources.

In one embodiment, the second information comprises L target fields; the L target fields are respectively used to indicate the L candidate reference signal resource sets, and the L identities associated with the L candidate reference signal resource sets.

In one embodiment, the first transmitter 1401A transmits a fourth information block; the fourth information block is used to indicate L second-type reference signal resource pools, the L candidate reference signal resource sets respectively correspond to the L second-type reference signal resource pools, and the second information block is used to indicate the L candidate reference signal resource sets from the L second-type reference signal resource pools.

In one embodiment, the first transmitter 1401A comprises at least first four of the antenna 420, the transmitter 418, the multi-antenna transmitting processor 471, the transmitting processor 416 and the controller/processor 475 in Embodiment 4.

In one embodiment, the second transmitter 1402A comprises at least first four of the antenna 420, the transmitter 418, the multi-antenna transmitting processor 471, the transmitting processor 416 and the controller/processor 475 in Embodiment 4.

In one embodiment, the third transmitter 1403A comprises at least first four of the antenna 420, the transmitter 418, the multi-antenna transmitting processor 471, the transmitting processor 416 and the controller/processor 475 in Embodiment 4.

Embodiment 14B

Figure 14B:
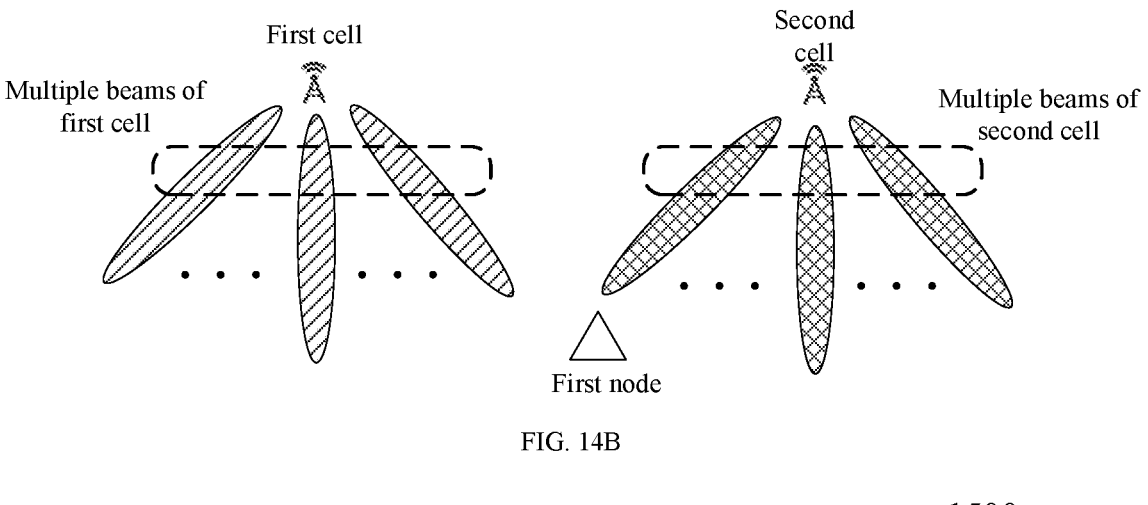
FIG. 14B illustrates a schematic diagram of an application scenario according to one embodiment of the present application.

Embodiment 14B illustrates a schematic diagram of an application scenario, as shown in FIG. 14B. In FIG. 14B, the first resource set and the second resource set are configured by a first cell in the figure to the first node at the same time, and the second cell is an adjacent cell of the first cell; the first node moves from the first cell to the second node without layer 3 switching; when the first node respectively receives the first signaling and the second signaling in the first resource set and the second resource set, the first node needs to judge whether a HARQ-ACK associated with the first signaling and a HARQ-ACK associated with the second signaling can adopt a same HARQ-ACK codebook.

In one embodiment, the first cell corresponds to the target cell in the present application, and the second cell corresponds to the first candidate cell in the present application.

In one embodiment, the first node cannot determine the first signaling and the second signaling are respectively transmitted by which cell.

In one embodiment, both the first resource set and the second resource set can be used by the first cell for a PDCCH transmission.

In one embodiment, both the first resource set and the second resource set can be used by the second cell for a PDCCH transmission.

In one embodiment, when a second-type identity activating the first resource set and a second-type identity activating the second resource set respectively belong to the first cell and the second cell, it means that the first signaling and the second signaling respectively transmitted by adopting a beam of the first cell and a beam of the second cell, so that a HARQ-ACK associated with the first signaling and a HARQ-ACK associated with the second signaling cannot adopt a same HARQ-ACK codebook.

In one embodiment, when a second-type identity activating the first resource set and a second-type identity activating the second resource set belong to the first cell or the second cell at the same time, it means that the first signaling and the second signaling are transmitted by adopting same beams from a cell, so that A HARQ-ACK associated with the first signaling and a HARQ-ACK associated with the second signaling can adopt a same HARQ-ACK codebook.

Embodiment 15

Figure 15:
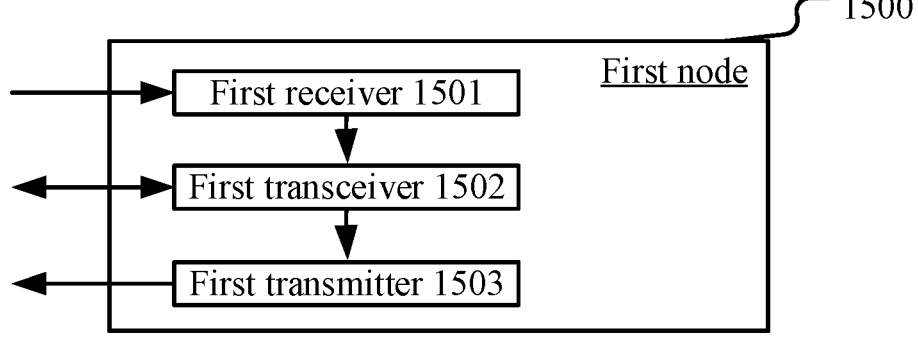
FIG. 15 illustrates a structure block diagram of a processor in a first node according to one embodiment of the present application.

Embodiment 15 illustrates a structure block diagram of a processor in a first node, as shown in FIG. 15. In FIG. 15, a first node 1500 comprises a first receiver 1501, a first transceiver 1502 and a first transmitter 1503.

The first receiver 1501 receives K information blocks, K being a positive integer greater than 1, each of the K information blocks comprises a first-type identity and at least one second-type identity, and each of the K information blocks is used to indicate a resource set;

the first transceiver 1502 respectively receives a first signaling and a second signaling in a first resource set and a second resource set; the first resource set is the resource set indicated by a first information block, the first information block is one of the K information blocks, the second resource set is the resource set indicated by a second information block, and the second information block is an information block other than the first information block among the K information blocks;

the first transmitter 1503 transmits first Uplink Control Information (UCI) in a physical-layer channel on a first cell, the first cell is capable of bearing a HARQ-ACK associated with the first signaling;

In embodiment 15, name of the first-type identity comprises CORESETPoolIndex; any second-type identity comprised in the K information blocks indicates a reference signal resource; a demodulation reference signal of a channel occupied by the first signaling and a first reference signal resource are QCL, and the second-type identity comprised in the first information block indicates the reference signal resource; a demodulation reference signal of a channel occupied by the second signaling and a second reference signal resource are QCL, and the second-type identity comprised in the second information block indicates the second reference signal resource; the first reference signal resource is associated with a target cell, and the second reference signal resource is associated with a first candidate cell; the first UCI comprises a HARQ-ACK associated with a second signaling, and the first-type identity indicated by the first information block and the target cell are used together to determine whether the first UCI comprises a HARQ-ACK associated with the first signaling.

In one embodiment, the first transceiver 1502 receives a third information block, and the third information block is used to indicate the second-type identity comprised in the first information block.

In one embodiment, the first transceiver 1502 transmits a first uplink information block, and the first uplink information block is used to indicate the second-type identity comprised in the first information block.

In one embodiment, the first transceiver 1502 receives a fourth information block, and the fourth information block is used to indicate the second-type identity comprised in the second information block.

In one embodiment, the first transceiver 1502 transmits a second uplink information block, and the second uplink information block is used to indicate the second-type identity comprised in the second information block.

In one embodiment, the first transceiver 1502 receives a first radio signal; the first signaling comprises configuration information of the first radio signal; the HARQ-ACK associated with the first signaling indicates whether a bit block carried by the first radio signal is correctly decoded.

In one embodiment, the first transceiver 1502 receives a second radio signal; and the second signaling comprises configuration information of the second radio signal; the HARQ-ACK associated with the second signaling indicates whether a bit block carried by the second radio signal is correctly decoded.

In one embodiment, time-domain resources occupied by the first UCI are reference time-domain resources associated with HARQ-ACK of the second signaling.

In one embodiment, the first-type identity comprised in the first information block is the same as the first-type identity comprised in the second information block; all conditions in a first condition set being satisfied is used to determine that the first UCI does not comprise a HARQ-ACK associated with the first signaling, and the first condition set comprises: the first candidate cell is different from the target cell.

In one embodiment, the first condition set comprises: there does not exist two second-type identities respectively comprised in two of the K information blocks indicating a same reference signal resource associated with the target cell, and the first-type identities comprised in the two information blocks are different.

In one embodiment, HARQ-ACK(s) associated with all downlink physical-layer signalings of the target cell is(are) not fed back.

In one embodiment, an offset between a reception of the first signaling and the first radio signal is less than a first offset value; a demodulation reference signal comprised in the first radio signal and a demodulation reference signal comprised in a CORESET with a minimum CORESET identity in a first target CORESET pool are QCL; the first target CORESET pool comprises a CORESET indicated by any information block in a first information block subset; the first information block subset comprises a first target information block, and the first target information block is any information block in all information blocks satisfying a first target condition set among the K information blocks; the first target condition set comprises that a first-type identity comprised in the first target information block is the same as the first-type identity comprised in the first information block; and the first target condition set comprises that the first target information block comprises at least one second-type identity, and reference signal resources indicated by the second-type identity comprised in the first target information block are associated with the target cell.

In one embodiment, the first-type identity comprised in the first information block is different from the first-type identity comprised in the second information block; all conditions in a second condition set being satisfied is used to determine that the first UCI comprises a HARQ-ACK associated with the first signaling, and the second condition set comprises: the first candidate cell is the same as the target cell.

In one embodiment, the second condition set comprises: there exist two second-type identities respectively comprised in two of the K information blocks indicating a same reference signal resource associated with the target cell, and the first-type identities comprised in the two information blocks are different.

In one embodiment, an offset between a reception of the first signaling and the first radio signal is less than a first offset value; a demodulation reference signal comprised in the first radio signal and a demodulation reference signal comprised in a CORESET with a minimum CORESET identity in a second target CORESET pool are QCL; the second target CORESET pool comprises a CORESET indicated by any information block in a second information block subset; the second information block subset comprises a second target information block, and the second target information block is any information block in all information blocks satisfying a second target condition set among the K information blocks; the second target condition set comprises that the second target information block comprises at least one second-type identity, and reference signal resources indicated by the second-type identity comprised in the second target information block are associated with the target cell.

In one embodiment, the first receiver 1501 comprises at least first four of the antenna 452, the receiver 454, the multi-antenna receiving processor 458, the receiving processor 456 and the controller/processor 459 in Embodiment 4.

In one embodiment, the first transceiver 1502 comprises at least first six of the antenna 452, the receiver/transmitter 454, the multi-antenna receiving processor 458, the multi-antenna transmitting processor 457, the receiving processor 456, the transmitting processor 468, and the controller/processor 459 in Embodiment 4.

In one embodiment, the first transmitter 1503 comprises at least the first four of the antenna 452, the transmitter 454, the multi-antenna transmitting processor 457, the transmitting processor 468 and the controller/processor 459 in Embodiment 4.

Embodiment 16

Figure 16:
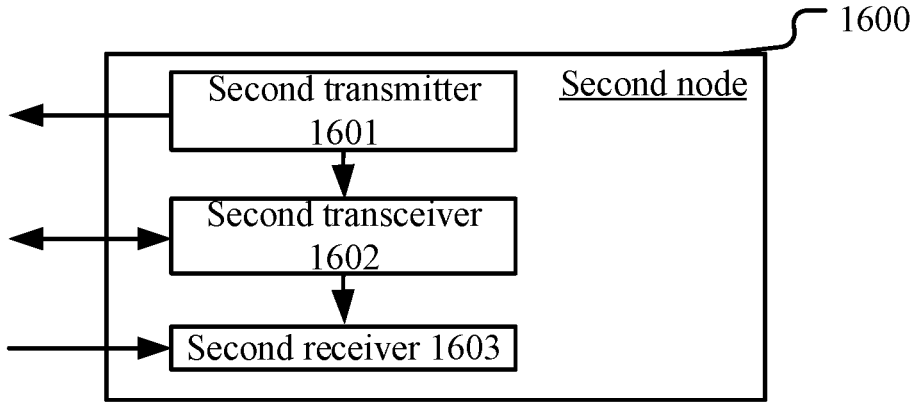
FIG. 16 illustrates a structure block diagram of a processor in second node according to one embodiment of the present application.

Embodiment 16 illustrates a structure block diagram of a processor in a second node, as shown in FIG. 16. In FIG. 16, a second node 1600 comprises a second transmitter 1601, a second transceiver 1602 and a second receiver 1603.

The second transmitter 1601 transmits K information blocks, K being a positive integer greater than 1, each of the K information blocks comprises a first-type identity and at least one second-type identity, and each of the K information blocks is used to indicate a resource set;

the second transceiver 1602 respectively transmits a first signaling and a second signaling in a first resource set and a second resource set; the first resource set is the resource set indicated by a first information block, the first information block is one of the K information blocks, the second resource set is the resource set indicated by a second information block, and the second information block is an information block other than the first information block among the K information blocks;

the second receiver 1603 receives first Uplink Control Information (UCI) in a physical-layer channel on a first cell, the first cell is capable of bearing a HARQ-ACK associated with the first signaling;

In embodiment 16, name of the first-type identity comprises CORESETPoolIndex; any second-type identity comprised in the K information blocks indicates a reference signal resource; a demodulation reference signal of a channel occupied by the first signaling and a first reference signal resource are QCL, and the second-type identity comprised in the first information block indicates the reference signal resource; a demodulation reference signal of a channel occupied by the second signaling and a second reference signal resource are QCL, and the second-type identity comprised in the second information block indicates the second reference signal resource; the first reference signal resource is associated with a target cell, and the second reference signal resource is associated with a first candidate cell; the first UCI comprises a HARQ-ACK associated with a second signaling, and the first-type identity indicated by the first information block and the target cell are used together to determine whether the first UCI comprises a HARQ-ACK associated with the first signaling.

In one embodiment, the second transceiver 1602 transmits a third information block, and the third information block is used to indicate the second-type identity comprised in the first information block.

In one embodiment, the second transceiver 1602 receives a first uplink information block, and the first uplink information block is used to indicate the second-type identity comprised in the first information block.

In one embodiment, the second transceiver 1602 transmits a fourth information block, and the fourth information block is used to indicate the second-type identity comprised in the second information block.

In one embodiment, the second transceiver 1602 receives a second uplink information block, and the second uplink information block is used to indicate the second-type identity comprised in the second information block.

In one embodiment, the second transceiver 1602 transmits a first radio signal; the first signaling comprises configuration information of the first radio signal; the HARQ-ACK associated with the first signaling indicates whether a bit block carried by the first radio signal is correctly decoded.

In one embodiment, the second transceiver 1602 transmits a second radio signal; and the second signaling comprises configuration information of the second radio signal; the HARQ-ACK associated with the second signaling indicates whether a bit block carried by the second radio signal is correctly decoded.

In one embodiment, time-domain resources occupied by the first UCI are reference time-domain resources associated with a HARQ-ACK of the second signaling.

In one embodiment, the first-type identity comprised in the first information block is the same as the first-type identity comprised in the second information block; all conditions in a first condition set being satisfied is used to determine that the first UCI does not comprise a HARQ-ACK associated with the first signaling, and the first condition set comprises: the first candidate cell is different from the target cell.

In one embodiment, the first condition set comprises: there does not exist two second-type identities respectively comprised in two of the K information blocks indicating a same reference signal resource associated with the target cell, and the first-type identities comprised in the two information blocks are different.

In one embodiment, HARQ-ACK(s) associated with all downlink physical-layer signalings of the target cell is(are) not fed back.

In one embodiment, an offset between a reception of the first signaling and the first radio signal is less than a first offset value; a demodulation reference signal comprised in the first radio signal and a demodulation reference signal comprised in a CORESET with a minimum CORESET identity in a first target CORESET pool are QCL; the first target CORESET pool comprises a CORESET indicated by any information block in a first information block subset; the first information block subset comprises a first target information block, and the first target information block is any information block in all information blocks satisfying a first target condition set among the K information blocks; the first target condition set comprises that a first-type identity comprised in the first target information block is the same as the first-type identity comprised in the first information block; and the first target condition set comprises that the first target information block comprises at least one second-type identity, and reference signal resources indicated by the second-type identity comprised in the first target information block are associated with the target cell.

In one embodiment, the first-type identity comprised in the first information block is different from the first-type identity comprised in the second information block; all conditions in a second condition set being satisfied is used to determine that the first UCI comprises a HARQ-ACK associated with the first signaling, and the second condition set comprises: the first candidate cell is the same as the target cell.

In one embodiment, the second condition set comprises: there exist two second-type identities respectively comprised in two of the K information blocks indicating a same reference signal resource associated with the target cell, and the first-type identities comprised in the two information blocks are different.

In one embodiment, an offset between a reception of the first signaling and the first radio signal is less than a first offset value; a demodulation reference signal comprised in the first radio signal and a demodulation reference signal comprised in a CORESET with a minimum CORESET identity in a second target CORESET pool are QCL; the second target CORESET pool comprises a CORESET indicated by any information block in a second information block subset; the second information block subset comprises a second target information block, and the second target information block is any information block in all information blocks satisfying a second target condition set among the K information blocks; the second target condition set comprises that the second target information block comprises at least one second-type identity, and reference signal resources indicated by the second-type identity comprised in the second target information block are associated with the target cell.

In one embodiment, the second transmitter 1601 comprises at least first four of the antenna 420, the transmitter 418, the multi-antenna transmitting processor 471, the transmitting processor 416 and the controller/processor 475 in Embodiment 4.

In one embodiment, the second transceiver 1602 comprises at least first six of the antenna 420, the transmitter/receiver 418, the multi-antenna transmitting processor 471, the multi-antenna receiving processor 472, the transmitting processor 416, the receiving processor 470, and the controller/processor 475 in Embodiment 4.

In one embodiment, the second receiver 1603 comprises at least the first four of the antenna 420, the receiver 418, the multi-antenna receiving processor 472, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present application includes but is not limited to mobile phones, tablet computers, notebooks, network cards, low-consumption equipment, enhanced MTC (eMTC) terminals, NB-IOT terminals, vehicle-mounted communication equipment, vehicles, cars, RSUs, aircrafts, diminutive airplanes, unmanned aerial vehicles, telecontrolled aircrafts and other wireless communication devices. The second node in the present application includes but is not limited to macro-cellular base stations, femtocell, micro-cellular base stations, home base stations, relay base station, eNB, gNB, Transmitter Receiver Point (TRP), GNSS, relay satellites, satellite base stations, space base stations, RSUs, Unmanned Aerial Vehicle (UAV), test devices, for example, a transceiver or a signaling tester simulating some functions of a base station and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE) configured for wireless communications, the UE comprising:

a receiver; and a processor, wherein:

the receiver and the processor are configured to receive a first information block and a second information block, wherein the first information block indicates a target reference signal resource, wherein the second information block indicates L candidate reference signal resource sets, L being a positive integer greater than 1, wherein the target reference signal resource is associated with one of L identities, the L identities are respectively associated with the L candidate reference signal resource sets;

the receiver and the processor are further configured to monitor a first signaling in a first time-frequency resource set, wherein a demodulation reference signal of a channel occupied by the first signaling and the target reference signal resource are Quasi Co-Located (QCL), wherein the first signaling comprises a first field, wherein the first field indicates a first reference signal resource from a first reference signal resource set, wherein the first reference signal resource set is one of the L candidate reference signal resource sets, wherein the first reference signal resource set is a candidate reference signal resource set associated with a first identity among the L candidate reference signal resource sets, and the first identity is an identity associated with the target reference signal resource among the L identities; and the receiver and the processor are further configured to receive a first signal in a second time-frequency resource set, wherein a demodulation reference signal of a channel occupied by the first signaling and the target reference signal resources are quasi co-located (QCL).

2. The UE of claim 1, wherein a demodulation reference signal (DMSR) of a channel occupied by the first signaling and the target reference signal resource have a first QCL relation, and a DMRS of a channel occupied by the first signal and the first reference signal resource have a second QCL relation; the first information block comprises a first TCI state, and the first TCI state indicates the target reference signal resource and the first QCL relation; the second information block comprises L TCI state sets, the L TCI state sets respectively correspond to the L candidate reference signal resource sets, any of the L TCI state sets comprises at least one TCI state, and a TCI state in any of the L TCI state sets indicates a candidate reference signal in a corresponding candidate reference signal resource set and a QCL relation; the second QCL relation and the first reference signal resource are indicated by a same TCI state.

3. The UE of claim 1, wherein the L identities respectively indicate L cells; when an identity is used to generate a signal in a reference signal resource, the reference signal resource is associated with the identity; or, when a reference signal resource and a synchronization signal block (SSB) of a cell are QCL, the reference signal resource is associated with an identity indicating the cell.

4. The UE of claim 1, wherein the L identities respectively indicate L cells, radio resources occupied by a reference signal resource are indicated by a configuration signaling, a radio link control (RLC) bearer associated with the configuration signaling is configured through a CellGroupConfig information element (IE), and when a special cell (Spcell) configured by the CellGroupConfig IE comprises a cell, the reference signal is associated with an identity indicating the cell.

5. The UE of claim 1, wherein the first information block comprises a second field, the second field is used to indicate an identity associated with the target reference signal resource among the L identities, and a number of one or more bits occupied by the second field is greater than 5.

6. The UE of claim 1, wherein the receiver and the processor are further configured to receive a third information block, the third information block is used to indicate M1 first-type reference signal resources, M1 being a positive integer greater than 1, the target reference signal resource is one of the M1 first-type reference signal resources, and the first information block is used to indicate the target reference signal resource from the M1 first-type reference signal resources.

7. The UE of claim 1, wherein the second information block comprises L target fields; the L target fields are respectively used to indicate the L candidate reference signal resource sets, and the L identities associated with the L candidate reference signal resource sets.

8. The UE of claim 1, wherein the receiver and the processor are further configured to receive a fourth information block, wherein the fourth information block is used to indicate L second-type reference signal resource pools, the L candidate reference signal resource sets respectively correspond to the L second-type reference signal resource pools, and the second information block is used to indicate the L candidate reference signal resource sets from the L second-type reference signal resource pools.

9. The UE of claim 1, wherein:

the target reference signal resource is associated with a TCI state, radio resource control (RRC) configuration information of the TCI state also comprises a given identity associated with the target reference signal resource, and the given identity is one of the L identities; or the target reference signal resource is associated with a channel state information reference signal (CSI-RS) resource, RRC configuration information of the CSI-RS resource also comprises a given identity associated with the target reference signal resource, and the given identity is one of the L identities.

10. The UE of claim 1, wherein any of the L identities is a physical cell identity (PCI), or any of the L identities is a CellGroupId, or any of the L identities is a PhysicalCell-GroupId.

11. A method for use in a user equipment (UE) configured for wireless communications, the method comprising:

receiving a first information block and a second information block, wherein the first information block indicates a target reference signal resource, wherein the second information block indicates L candidate reference signal resource sets, L being a positive integer greater than 1, wherein the target reference signal resource is associated with one of L identities, the L identities are respectively associated with the L candidate reference signal resource sets;

monitoring a first signaling in a first time-frequency resource set, wherein a demodulation reference signal of a channel occupied by the first signaling and the target reference signal resource are quasi co-located (QCL), wherein the first signaling comprises a first field, wherein the first field indicates a first reference signal resource from a first reference signal resource set, wherein the first reference signal resource set is one of the L candidate reference signal resource sets, wherein the first reference signal resource set is a candidate reference signal resource set associated with a first identity among the L candidate reference signal resource sets, and the first identity is an identity associated with the target reference signal resource among the L identities; and receiving a first signal in a second time-frequency resource set, wherein a demodulation reference signal of a channel occupied by the first signaling and the target reference signal resources are quasi co-located (QCL).

12. The method of claim 11, wherein a demodulation reference signal (DMSR) of a channel occupied by the first signaling and the target reference signal resource have a first QCL relation, and a DMRS of a channel occupied by the first signal and the first reference signal resource have a second QCL relation; the first information block comprises a first TCI state, and the first TCI state indicates the target reference signal resource and the first QCL relation; the second information block comprises L TCI state sets, the L TCI state sets respectively correspond to the L candidate reference signal resource sets, any of the L TCI state sets comprises at least one TCI state, and a TCI state in any of the L TCI state sets indicates a candidate reference signal in a corresponding candidate reference signal resource set and a QCL relation; the second QCL relation and the first reference signal resource are indicated by a same TCI state.

13. The method of claim 11, wherein the L identities respectively indicate L cells; when an identity is used to generate a signal in a reference signal resource, the reference signal resource is associated with the identity; or, when a reference signal resource and a synchronization signal block (SSB) of a cell are QCL, the reference signal resource is associated with an identity indicating the cell.

14. The method of claim 11, wherein the L identities respectively indicate L cells, radio resources occupied by a reference signal resource are indicated by a configuration signaling, a radio link control (RLC) bearer associated with the configuration signaling is configured through a Cell-GroupConfig information element (IE), and when a special cell (Spcell) configured by the CellGroupConfig IE comprises a cell, the reference signal is associated with an identity indicating the cell.

15. The method of claim 11, wherein the first information block comprises a second field, the second field is used to indicate an identity associated with the target reference signal resource among the L identities, and a number of one or more bits occupied by the second field is greater than 5.

16. The method of claim 11, further comprising:

receiving a third information block, wherein the third information block is used to indicate M1 first-type reference signal resources, M1 being a positive integer greater than 1, the target reference signal resource is one of the M1 first-type reference signal resources, and the first information block is used to indicate the target reference signal resource from the M1 first-type reference signal resources.

17. The method of claim 11, wherein the second information block comprises L target fields; the L target fields are respectively used to indicate the L candidate reference signal resource sets, and the L identities associated with the L candidate reference signal resource sets.

18. The method of claim 11, further comprising:

receiving a fourth information block, wherein the fourth information block is used to indicate L second-type reference signal resource pools, the L candidate reference signal resource sets respectively correspond to the L second-type reference signal resource pools, and the second information block is used to indicate the L candidate reference signal resource sets from the L second-type reference signal resource pools.

19. The method of claim 11, wherein:

the target reference signal resource is associated with a TCI state, radio resource control (RRC) configuration information of the TCI state also comprises a given identity associated with the target reference signal resource, and the given identity is one of the L identities; or the target reference signal resource is associated with a channel state information reference signal (CSI-RS) resource, RRC configuration information of the CSI-RS resource also comprises a given identity associated with the target reference signal resource, and the given identity is one of the L identities.

20. The method of claim 11, wherein any of the L identities is a physical cell identity (PCI), or any of the L identities is a CellGroupId, or any of the L identities is a PhysicalCellGroupId.

* * * * *